(12) United States Patent
Zeller et al.

(10) Patent No.: US 7,534,287 B2
(45) Date of Patent: *May 19, 2009

(54) POROUS SINTERED COMPOSITE MATERIALS

(75) Inventors: Robert Zeller, Boston, MA (US); Christopher Vroman, Shrewsbury, MA (US)

(73) Assignee: Entegris, Inc., Chaska, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/001,112

(22) Filed: Dec. 10, 2007

(65) Prior Publication Data

US 2008/0149571 A1 Jun. 26, 2008

Related U.S. Application Data

(63) Continuation of application No. 11/502,215, filed on Aug. 10, 2006, now Pat. No. 7,329,311, which is a continuation of application No. 10/733,218, filed on Dec. 11, 2003, now Pat. No. 7,112,237.

(60) Provisional application No. 60/475,729, filed on Jun. 4, 2003, provisional application No. 60/455,993, filed on Mar. 19, 2003, provisional application No. 60/432,910, filed on Dec. 12, 2002.

(51) Int. Cl.
*B01D 39/20* (2006.01)
*B01D 46/00* (2006.01)
*B01D 50/00* (2006.01)

(52) U.S. Cl. .............. 95/273; 95/274; 55/318; 55/486; 55/487; 55/495; 55/498; 55/512; 55/516; 55/523; 428/546; 428/547; 428/550; 428/615; 428/680; 428/402; 428/689; 210/490; 210/500.21; 210/500.25; 210/510.1

(58) Field of Classification Search ............ 55/318, 55/486, 487, 495, 498, 512, 515, 516, 518, 55/523, 527; 95/273, 274, 287; 210/490, 210/500.1, 500.21, 500.22, 503, 505, 506, 210/508, 509, 500.25, 510.1; 428/546–548, 428/550–553, 565–568, 610, 613–615, 621, 428/304.4, 680, 369, 372, 397, 401, 402, 428/411.1, 457, 698, 689, 697; 516/9; 264/603, 264/628, DIG. 48; 427/189, 190, 191
See application file for complete search history.

(56) References Cited

U.S. PATENT DOCUMENTS 4,039,703 A 8/1977 Kamijo et al.

(Continued)

FOREIGN PATENT DOCUMENTS

CN ZL 01109223.8 11/2003

(Continued)

*Primary Examiner*—Jason M Greene
(74) *Attorney, Agent, or Firm*—John E. Pillion; Timothy J. King

(57) ABSTRACT

The present invention is directed to porous composite materials comprised of a porous base material and a powdered nanoparticle material. The porous base material has the powdered nanoparticle material penetrating a portion of the porous base material; the powdered nanoparticle material within the porous base material may be sintered or interbonded by interfusion to form a porous sintered nanoparticle material within the pores and or on the surfaces of the porous base material. Preferably this porous composite material comprises nanometer sized pores throughout the sintered nanoparticle material. The present invention is also directed to methods of making such composite materials and using them for high surface area catalysts, sensors, in packed bed contaminant removal devices, and as contamination removal membranes for fluids.

15 Claims, 11 Drawing Sheets

U.S. PATENT DOCUMENTS

| | | |
|---|---|---|
| 4,186,100 A | 1/1980 | Mott |
| 4,412,921 A | 11/1983 | Leung |
| 4,629,483 A | 12/1986 | Stanton |
| 4,746,341 A | 5/1988 | Komoda |
| 4,888,114 A | 12/1989 | Gaddis |
| 5,205,937 A | 4/1993 | Bhave |
| 5,364,586 A | 11/1994 | Trusov et al. |
| 5,487,771 A | 1/1996 | Zeller |
| 5,605,553 A | 2/1997 | Connolly et al. |
| 5,839,049 A | 11/1998 | Ettel et al. |
| 5,993,502 A | 11/1999 | Motoki et al. |
| 6,038,060 A | 3/2000 | Crowley |
| 6,077,800 A | 6/2000 | Takahashi et al. |
| 6,080,219 A | 6/2000 | Jha et al. |
| 6,090,289 A | 7/2000 | Verduijn et al. |
| 6,113,795 A | 9/2000 | Subramaniam et al. |
| 6,264,726 B1 | 7/2001 | Phelps |
| 6,355,082 B1 | 3/2002 | Ishibe |
| 6,468,333 B2 | 10/2002 | Spiegelman et al. |
| 6,808,768 B2 | 10/2004 | Satou et al. |
| 7,112,237 B2 * | 9/2006 | Zeller et al. .................. 95/273 |
| 7,329,311 B2 * | 2/2008 | Zeller et al. .................. 95/273 |
| 2001/0001453 A1 | 5/2001 | Thoraval |
| 2002/0074282 A1 | 6/2002 | Herrmann et al. |
| 2004/0050773 A1 | 3/2004 | Neumann et al. |

FOREIGN PATENT DOCUMENTS

| | | |
|---|---|---|
| EP | 0 808 655 A1 | 11/1997 |
| JP | 9-220423 | 8/1997 |
| WO | WO 91/12879 A | 3/1991 |
| WO | WO 95/27556 A | 10/1995 |

* cited by examiner

POROUS SINTERED COMPOSITE MATERIALS

CROSS REFERENCE TO RELATED APPLICATIONS

This application is a continuation of U.S. patent application Ser. No. 11/502,215, filed Aug. 10, 2006, issued as U.S. Pat. No. 7,329,311 B2 on 12 Feb. 2008, which is a continuation of U.S. patent application Ser. No. 10/733,218, filed Dec. 11, 2003, issued as U.S. Pat. No. 7,112,237 B2 on 26 Sep. 2006, which claims the benefit of U.S. Provisional Application Ser. No. 60/432,910, filed Dec. 12, 2002, titled "Nanoporous Sintered Composite Materials;" U.S. Provisional Application Ser. No. 60/455,993, filed Mar. 19, 2003, titled "Depth Filtration of Supercritical Fluids;" and U.S. Provisional Application Ser. No. 60/475,729, filed Jun. 4, 2003, titled "Depth Filtration of Supercritical Fluids and Improvements Thereto," the contents of which are each incorporated herein by reference in their entirety.

BACKGROUND

Porous materials may be obtained by molding and sintering powders containing fibrous, dentritic, or spherical shaped precursor particles. The precursor particles are commonly metals, like platinum, or nickel, or their alloys, ceramic materials like alumina, or polymeric materials like polytetrafluoroethylene. In such porous materials, the strength of the material, the size of the pores in the material, and the surface area of the material are related to the packing density, the size, the shape, and the composition of the particles making up the powder. Sintering process conditions also affect the strength, pore size, and surface area of such porous materials. To achieve small pores and high surface area, the sintering of small diameter particles is preferred.

In materials with large pore sizes, the size of the pores may be further reduced using a variety of techniques. For some materials it may be possible to vapor deposit, electroplate, or electroless plate additional material into the pores of the base porous material. These methods result in uniform coverage and reduced pore size, but they also results in reduced surface area of the material. Alternatively, a slurry of particles is formed and applied by spraying or brushing the slurry onto the surface of the material and then sintering it after drying. This method does not ensure penetration of the particles into the substrate so as to occupy at least a portion of the inner pores. This method results in poor adhesion between the applied slurry and the porous substrate due to differential shrinkage of the slurry powder and the substrate surface during sintering. Further, this method may not build up of a layer or powdered precursor capable of sintering to form a porous structure.

Porous and high surface area materials are used in, catalysis, gas sensing, and filtration. For example, finely divided noble metals or alloys (Pd, Pt, and Rh) deposited on a porous ceramic or metal substrate may be used as a combustion catalyst to thermally decompose hydrocarbons gases; these types of catalysts may also be used to remove $NO_x$ and CO from exhaust gases. Porous materials may be used as electrodes in fuel cells where the electrolyte in the cell is a solid polymer. For proper operation, the polymer electrolyte in these fuel cells needs to be maintained in a hydrated form to prevent loss of ionic conduction through the electrolyte. In order to maintain membrane hydration and suitable reactions at the cell electrodes, one or more of the cell's electrodes may be made from very small metal particles (usually 2-5 nm diameter) that are distributed on, and supported by, larger conducting particles. These supported metal particles are formed into high surface area electrodes that are porous in order to optimize contact between the reactant gas, the electrolyte, and the metal catalyst. Pellistors are gas sensors having a porous metal electrode on a ceramic, (i.e. a $ThO_2$ and $Al_2O_3$ ceramic pellet coated with a porous catalytic metal like Pd or Pt), that reacts with flammable gases to generate heat which is detected by an RTD embedded in the ceramic pellet. The detection limit for these sensors is related to the amount of heat generated by the decomposition reaction; this depends on the active area of the porous metal electrode.

Sintered ceramic and metal gas filters typically have pore sizes in the 1-10 um range and can remove particles down to 0.003 micron with a log retention value of greater than 9. In gases, particle capture is by diffusion and interception with the filter surface. Because of the low viscosity of gases, the filters are able to flow large volumes of gas with nominal pressure drop across the membrane. In liquids these same filters would only remove particles in the 1-10 um range with an LRV of about 2 because sieving is the dominant mechanism for particle removal or capture in liquids. Because of the higher viscosity of the liquid, the pressure drop across the same filters for a given volumetric flow rate would be greater for a liquid than for a gas. Supercritical fluids, those materials whose temperature and pressure are above the critical values, have properties that are intermediate between those of gases and liquids. Supercritical fluids generally retain the solvation properties and densities of the liquid while having gas like viscosities and surface tensions. Because of a supercritical fluid's solvating properties, it interacts with both the particle and filter surfaces, particles in supercritical fluids are preferably removed from the fluid by sieving rather than diffusion and interception. Because of their gas like viscosity and surface tension, supercritical fluids will have a pressure drops across the same filter more like a gas than a liquid. It is possible that smaller pores, nanometer sized pores or smaller, may be designed into the filter to capture nanometer and sub-nanometer size particles by sieving but without greatly increasing the pressure drop of the filter.

It would be desirable to have a mechanically strong, high surface area, material with small pores. Further, it would be desirable to be able to make objects with these properties with different materials and in a variety of shapes and sizes.

SUMMARY

One embodiment of the present invention is a porous composite material, comprised of a porous base material and a powdered nanoparticle material. The porous base material has the powdered nanoparticle material penetrating a portion of the porous base material. The powdered nanoparticles penetrating the porous base material may then be interbonded to one another by interfusion or sintered to form a porous sintered nanoparticle material within the pores of the porous base material. Preferably this sintered porous composite material includes nanometer and sub-nanometer sized pores throughout the thickness of sintered nanoparticle composite material, permitting flow of a fluid therethrough, and preferably removing particles from the fluid by sieving. The pores of the porous sintered nanoparticle material are smaller than the base material, permit a flow of fluid through the porous sintered nanoparticle material, and may have their largest dimension less than about 5000 nanometers; preferably less than 1000 nanometers, more preferably less than 200 nanometers, and even more preferably less than 50 nanometers. The porous sintered composite material may be bonded to a housing for connection to a fluid flow circuit, the bond between the housing and the porous sintered composite material providing a substantially uniform particle retention across the sintered porous composite material joined to the housing.

Alternatively, the powdered nanoparticle material may be allowed to penetrate a portion of the porous base and then accumulate on one or more surfaces of the porous base to form a layer of the nanoparticle material. After sintering, a sintered porous composite material that includes a porous sintered nanoparticle material within the pores of the base and a porous layer of sintered nanoparticle material on one or more surfaces of the porous base is formed. The porous layer of sintered nanoparticle material forms a continuous structure with the porous sintered nanoparticle material within the pores of the base. The thickness of the porous composite material includes the porous base material and one or more sintered porous nanoparticle material layers. The powdered material in the pores of the base may sinter to the base material or only sinter to itself. The powdered nanoparticles in the fine layer on the one or more surfaces of the porous base may sinter to the base material, sintered to both, or sintered only to the nanoparticle material. Preferably the sintered porous composite material comprises nanometer and sub-nanometer sized pores throughout the sintered porous nanoparticle material. Preferably this sintered porous composite material comprises nanometer and sub-nanometer sized pores throughout the sintered nanoparticle composite material, permits a flow of a fluid therethrough, and preferably removes particles or contaminants from the fluid by sieving. The sintered porous composite material may also include a supercritical fluid within the pores of the material. The pores of the porous sintered nanoparticle material are smaller than the base material, permit a flow of fluid through the porous sintered nanoparticle material, and may have their largest dimension less than about 5000 nanometers; preferably less than 1000 nanometers, more preferably less than 200 nanometers, and even more preferably less than 50 nanometers. The porous composite material may comprise layers of different nanoparticle materials including but not limited to varying size, shape, and composition. The porous sintered composite material may be bonded to a housing. Preferably the bond between the housing and the porous sintered composite material retains the integrity of the porous sintered composite material and provides a substantially uniform particle retention across the sintered porous composite material joined to the housing.

The powdered nanoparticle materials making up the composite may have diameters less than about 1000 nanometers. Like the porous base materials, these nanoparticle materials may be metals, metal alloys, ceramics, thermoplastics, or mixtures of these materials. The starting nanoparticles should be able to penetrate into the porous base material, and may have shapes including but not limited to spheres, dendrites, fibers, or mixtures of these particles. Preferred powdered nanoparticle materials include dendrites of nickel or alloys containing nickel.

A sintered porous composite material may be made into an electrode element, a catalyst element, or a filter element. The element may be bonded to a housing or other suitable structure that maintains the integrity of the sintered porous composite material, provides mechanical support, and permit connection of the element into a fluid system.

In one embodiment of the present invention a sintered porous composite material or other filter element is welded or otherwise secured into a housing that is then filled with a powder composition. The porous sintered composite material may be bonded to the housing such that the bond between the housing and the porous sintered composite material retains the integrity of the porous sintered composite material and provides a substantially uniform particle retention across the sintered porous composite material joined to the housing. The powder may be distributed over the filter element within the housing suitable techniques until a packing density and the mass of powder are sufficient to remove particles or other contaminants from the fluid with which it will be used. Various configurations of the bed, including but not limited to graded particle size beds, baffles, as well as different particle materials comprising the bed are possible.

Another embodiment of the present invention is a method of making a porous composite material. The composite material is made by flowing a source of nanoparticle material suspended in a fluid medium into or through a porous base substrate and capturing a portion of the nanoparticle material particles within the porous base object. The captured nanoparticle material and porous base object may be sintered or interbonded by interfusion to form a sintered porous composite material. Depending upon its intended use, it may be desirable to allow the nanoparticle material to penetrate and accumulate as a porous layer on one or more surfaces of the porous base object. When the accumulated layer of nanoparticle material has reached its desired weight or thickness, the flow of nanoparticle material particles is stopped. The porous base with the accumulated layer of nanoparticle material are then sintered to form a sintered porous composite material including a layer, and preferably a fine layer, of nanoparticle material atop the porous substrate which penetrates a portion of the base material and forms a continuous structure with a porous sintered nanoparticle material within the pores of the base. Preferably this sintered porous composite material comprises nanometer and sub-nanometer sized pores throughout the sintered nanoparticle composite material and permits a flow of a fluid therethrough, and preferably retains particles and removes them from the fluid by sieving. The sintered porous composite material may also include a supercritical fluid within the pores of the material.

Another embodiment of the present invention is a method of making a porous composite material and a filter bed. The porous composite material may be made by flowing a source of nanoparticle material suspended in a fluid medium into or through a porous base substrate and capturing a portion of the nanoparticle material particles within the porous base object. The captured nanoparticle material and porous base object may be sintered or interbonded by interfusion to form the sintered porous composite material. Depending upon its intended use, it may be desirable to allow the nanoparticle material to penetrate and accumulate on one or more surfaces of the porous base object. When the accumulated layer of nanoparticle material has reached its desired weight or thickness, the flow of nanoparticle material particles is stopped and the element may be sintered. The sintered porous composite material element may be bonded or welded into a housing such that the porosity and integrity of the porous sintered composite material is retained. Micrometer or nanometer sized material may then be placed around the filter element to form a pack bed. Various configurations of the bed, including but not limited to graded particle size beds, baffles, as well as different particle materials can be made.

In another embodiment, the sintered porous composite material of this invention is characterized in that it has an LRV of at least about 2, and preferably 4 for about a 0.2 μm diameter PSL bead particle challenge by sieving in water. It may be characterized by having a pressure coefficient in nitrogen gas of less than about 250 $(psi\ cm^2)/slpm$, more preferably less than about 125 $(psi\ cm^2)/slpm$, and even more preferably less than about 30 (psi cm$^2$)/slpm. The material is able to withstand a differential pressure across the sintered porous composite material membrane of greater than 60 psi, and more preferably greater than about 400 psi. Even more preferably, the sintered porous composite material of the present invention is characterized in that it has an LRV of at least about 2, and preferably 4, for about a 0.05 μm diameter PSL bead particle challenge by sieving in water. The material may have a pressure coefficient in nitrogen gas of less than about 250 (psi cm$^2$)/slpm, more preferably less than about 125 (psi cm$^2$)/slpm, and even more preferably less than about 30 (psi cm$^2$)/slpm. The material is able to withstand a differential pressure across the porous composite material membrane, the porous base providing support for the porous sintered nanoparticle material, of greater than 60 psi, and more preferably greater than about 800 psi.

The depth of penetration of the powdered nanoparticle material into the porous base object to form the a porous composite material may be controlled by the velocity of the fluid medium flowing through the porous base object as well as the particle capture efficiency of the porous base. The amount of powdered nanoparticle material accumulated within the porous base or on the surface of the porous base may be controlled by the concentration of the particles in the slurry, the total volumetric flow through the porous base, the state of the fluid itself (i.e.; gas, liquid, or supercritical fluid) and the size of the particles. The nanoparticles may penetrate the porous base in a range from below the top surface through the entire depth of the porous base object.

In one method the porous composite material is made by flowing a source of un-agglomerated powdered nanoparticle material into or through the porous base material. At least a portion of these particles are captured within the pores, or within the pores and on top of one or more surfaces of the base material. The captured powdered nanoparticle material and base material are sintered to form the sintered porous composite material. The powdered nanoparticle material suspended in the fluid may be delivered into or flowed through the porous base material by atomizing or making a slurry of the particles in a fluid. Alternatively, a source of the powdered nanoparticle material may be isostatically pressed into the porous base material.

The formed sintered porous composite material may be used for filtering a fluid to remove suspended particles or contaminants from the fluid. The sintered porous composite material may also include a supercritical fluid within the pores of the material. A method for filtering the fluid includes providing a sintered porous composite element including a porous base and a sintered porous nanoparticle material penetrating the base pores and forming a porous layer on one or more surfaces of the base, and flowing a fluid with contaminants, like particles, through the element to remove one or more particles from the fluid. Preferably the particles are removed by sieving filtration. The sintered porous composite element may provide sieving filtration for small particles and would be advantageous in the case of filtration of supercritical fluids. The porous base of the element to provides mechanical support and allows the porous layer of sintered nanoparticle material on one or more surfaces of the base to withstand the high pressures in the supercritical fluid system. The sintered porous nanoparticle material within the pores of the base and atop the surfaces of the base may provide sieving filtration to various fluids; the low viscosity and surface tension of a supercritical fluid may minimize pressure drop across such a filter element. The high surface area of the sintered porous composite material may provide high particle retention and capacity, reduced pressure drop, and enable small footprint components to be made. A small diameter component is mechanically advantageous for any pressurized fluid system. This is because as the overall pressure of the system increases, the wall thickness of component must also increase to withstand such pressures; this increases material costs and also the size of the components.

The sintered porous composite material element could be used to remove materials like particles or molecular contaminants from gases by retention, chemically bonding, or catalytic action of the sintered porous nanoparticle material with the fluid. Interaction of the sintered porous composite material element may be by chemisorption or physisorption of the contaminants in the fluid with these high surface area materials. A method for removing material from a fluid includes flowing a fluid having the material or molecular contaminants in the fluid through a sintered porous composite material element wherein the sintered porous composite material element removes the material from the fluid. The material can be removed by particle capture, chemisorption, physisorption, or a combination of these. The sintered porous composite material may also include a supercritical fluid within the pores of the porous sintered composite material and may be used to remove contaminants from the fluid.

Another embodiment of the present invention is a supercritical fluid with less than 50 particles per milliliter, and preferably less than 5 particles per milliliter, the particles having a size of 0.2 micrometers or less and preferably 0.05 micrometers or less. Preferably the number of particles greater than about 0.2 micron in size remaining on a substrate cleaned with a about 5 liters of supercritical carbon dioxide fluid filtered with a sintered porous composite material or a device including a sintered porous composite material element of the present invention and a packed bed of material is less than about 300 counts on a 200 mm diameter substrate, and more preferably less about 100 counts on a 200 mm diameter substrate.

Because of the small pore size and high surface area of the porous composite materials and sintered porous composite materials of the present invention, they may provide sieving filtration for supercritical fluids with low pressure drop and high particle loading capacity. Prior to sintering these porous composite materials have a surface area in the range of 2-5 m$^2$/gram or more; following sintering the surface area is about 1 m$^2$/gram or more. The porous composite materials may also provide for improved detection limits for gas sensors, for example pellistors, that can use the sintered composite porous material as an electrode. The high surface area of the sintered porous nanoparticle material provides numerous sites for catalytic decomposition of the target gas which creates more heat for the thermal sensor to detect.

Advantageously, embodiments of the present invention do not require the use of a binder to form the sintered porous composite materials so that high purity membranes, catalysts, and sensor elements may be formed with out the need for burning off the residues of these binders. In addition, a porous sintered nanoparticle material within the pores of the base material forming a continuous structure with a porous sintered nanoparticles layer on one or more surfaces of the base and having interconnected nanometer and sub-nanometer sized pores, may be formed as a single layer in a single deposition step with the porous base material.

BRIEF DESCRIPTION OF THE FIGURES

In part, other aspects, features, benefits and advantages of the embodiments of the present invention will be apparent with regard to the following description, appended claims and accompanying drawings where:

DETAILED DESCRIPTION

Figure 1:
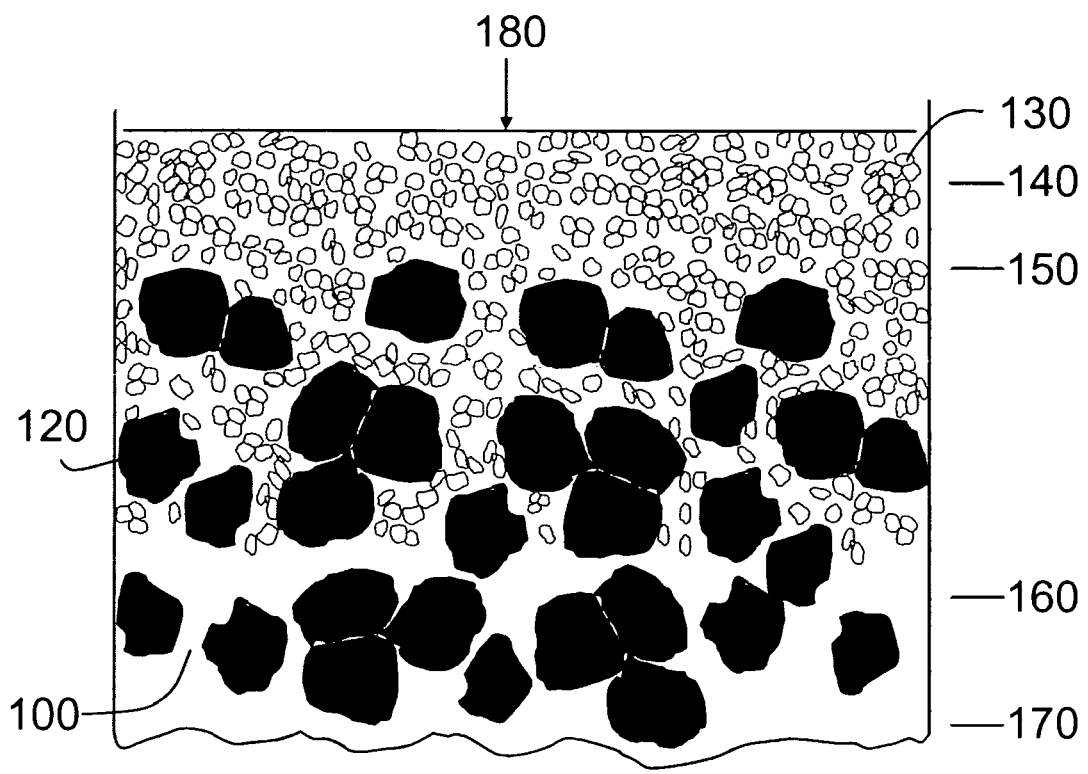
FIG. 1 is an illustration of a cross section of powdered nanoparticle material deposited on the green form of a porous base material.

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "particle" is a reference to one or more particle and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Embodiments of the present invention are sintered porous composite materials that include a porous base material and a layer of porous sintered nanoparticle material on one or more surfaces of the porous base and penetrating a portion of the porous base material. The porous sintered nanoparticle material has pores smaller than the pores in the porous base material. The porous sintered nanoparticle material layer on top of the base forms a continuous structure with the porous sintered nanoparticle material within the pores of the base. Preferably the sintered porous composite material includes nanometer and sub-nanometer sized pores throughout the sintered porous nanoparticle material that allow a fluid to flow through the porous sintered composite material and particles to be retained by the sintered porous composite material. The porous sintered composite material may include a supercritical fluid within its pores. The porous sintered composite material may be bonded to a housing for connection to a fluid flow circuit, the bond between the housing and the porous sintered composite material providing a substantially uniform particle retention across the sintered porous composite material joined to the housing.

The porous base material used for preparing the porous composite materials may be a metal, a ceramic, a polymeric material or a composite of these. The porous base may be sintered or a green form of suitably pressed powders. The pores of the base material are interconnected to permit fluid flow and the structure of the porous base may be symmetric, asymmetric, or other geometries known to those skilled in the art. Examples of such porous base materials include but are not limited to metal filter substrates which have an LRV of 9 or more in gases for 0.003 µm particles available from Mykrolis Corporation, Billerica, Mass., and Ni-based metal porous body commercially available as "CELMET"® prepared by Sumitomo Electric Ind., Ltd; . polymers such as sintered Teflon® and polyethylene from Porex, Fairburn, Ga.; flat sheet polymeric membranes are available from WL Gore, Elkton, Md.; porous ceramic elements are available from Filterite, Timonium, Md. The pore size or diameter for the porous base may be but is not limited to the range of about 0.05 to 100 microns, preferably from 0.05 to 50 microns, and more preferably 0.5 to 10 microns. The porous base may have a thickness such that it can mechanically support porous sintered composite material at the pressures and temperatures expected during use. Preferably the membranes have a thickness of from about 0.03 inches to about 0.1 inches. These membranes may also be characterized by the size particle used to make the porous base as well as their porosity. Particles used to make such porous base materials may range from 0.05 to 100 microns, preferably 0.5 to 10 microns. The porosity of these base materials may range from about 45 to about 70%. It is desirable that the pore size of the porous base material be such that the nanoparticles penetrate a portion of the porous base material. The density of the porous base may be less than the bulk density of the material that makes up the base.

The nanoparticles used to form the composite material may be, but are not limited to spherical, dentritic (as described in U.S. Pat. No. 5,814,272 incorporated by reference in its entirety), fibrous, or combinations of these shapes. Other regular or irregularly shaped particles may also be used to make the porous composite materials and sintered porous composite materials. The composition of the nanoparticles may be metals or metal alloys. Examples of useful metals and alloys include but are not limited to copper, nickel, nickel alloys, molybdenum, stainless steels, chromium, chromium alloys, and Hastalloy®. Ceramic or metal oxide powders useful for making the porous composite materials include but are not limited to alumina, silica, zeolites, titanium dioxide, and cerium dioxide. PTFE materials such as Teflon® 307 A, with for example a 0.16 micron nominal diameter, may also be used and are available from Dupont in the form of aqueous dispersions. Thermoplastics such as ultra high molecular weight polyethylene, poly(tetrafluoroethylene-co-perfluoro (alkylvinylether)), (poly(PTFE-co-PFVAE)), or poly(tetrafluoroethylene-co-hexafluoropropylene) or blends of these materials, available from Dupont, may also be used. Ceramic and metallic nanoparticle powders are available from Nanostructured & Amorphous Materials, Inc., Los Alomos, N. Mex. Nanoparticles may also be made by other methods including laser ablation of microspheres as described in U.S. Pat. No. 5,585,020 and incorporated herein by reference in its entirety.

Particle sizes for the powdered nanoparticle material used to form the sintered composite porous material are chosen with consideration for the pore size of the substrate and the desired pore size for the final sintered porous composite material. Generally, the smaller the desired pore size and the higher the surface area, the smaller the nanoparticle material that should be used to make the sintered porous composite material. The particle size distribution may be less than 25% rms of the particles in the sample. In some embodiments, the particle distribution may be less than 5 percent. Particles may have a diameter less than about 1000 nm, preferably less than 500 nm, more preferably less than 100 nm, and even more preferably less than 50 nm. Where non-spherical particles are used, the size may be taken as those corresponding to the largest dimension of the particle. Porous particles may also be used, for example mossy zinc or spongy nickel.

The porous composite material may be formed by suspending the powdered nanoparticle material into a fluid to form a slurry. Suitable fluids include but are not limited to air, nitrogen gas, water, ethanol water mixtures, and supercritical fluids. Preferably the slurry is comprised of non-agglomerated particles. The suspension of non-agglomerated particles may be formed by coating the particles with a suitable capping layer or adding a surfactant to the fluid. Alternatively, stirring the slurry and allowing the larger particles to settle may give a relatively uniform suspension of substantially non-agglomerated particles. The slurry, and preferably the non-agglomerated suspension, of nanoparticle materials is made to flow into or through the porous support or base material where at least a portion of the particles is retained in the porous base membrane. Alternatively, the slurry is made to flow into or through the membrane where a portion is retained by the porous base, and is also accumulated as a layer on top of one or more surface of the porous base. Flow of the suspended nanoparticle materials is stopped when the mass of material retained by the porous base and accumulated on its one or more surfaces is sufficient to provide a sintered porous composite with properties suitable for its intended use. This may include but are not limited to a high surface area, desired pore size, particle retention, catalytic or chemisoption activity, pressure drop or a combination of these. The penetration depth of the nanoparticles into the porous base may be changed by controlling the fluid velocity and size of particles delivered to the porous base and the state of the fluid itself. The liquid suspending the nanoparticles is preferably removed from the porous base and nanoparticles prior to sintering. It is preferred that the solvent from the deposited nanoparticle material be removed slowly to prevent cracking of the accumulated nanoparticle layer on the porous base.

The powdered nanoparticle materials may also be made to flow into or through the porous base by transporting the particles in a gas phase. Nanoparticles may be formed by gas phase nucleation of reactive gases, by flame reactors, or by spray pyrolysis. Nanoparticles formed by laser ablation of a surface material or laser ablated micro-particles may also be transported by a carrier gas into the porous base. Alternatively, a liquid suspension of nanoparticles is made into an aerosol using an ultrasonic atomizer (Sonics, Newton, Conn.) or a gas nebulizer (Meinhard, Santa Ana, Calif.). The liquid is evaporated from the particles after aerosol formation to yield solvent free particles which can be made to flow by a carrier gas through the porous base. The penetration depth of the nanoparticles into the porous base and accumulation of nanoparticles on its surfaces may be changed by controlling the velocity of the carrier gas through the porous base. The amount of material deposited on, or accumulated on, the porous base substrate may be determined by mass change of the porous base.

One or more surfaces of the porous substrate may have nanoparticles accumulated on them to form a layer, and preferably a fine layer, of the nanoparticle penetrating a portion of and atop of the surfaces of the porous substrate. Mixtures of nanoparticles with various shapes, sizes, and composition may be made to flow through the porous base or may be isostatically pressed into a green form, a porous base membrane, or a sintered frit. The layer of nanoparticle material atop the porous substrate base may be sintered to form a sintered porous nanoparticle material layer. The sintered porous nanoparticle material layer penetrates a portion of the base and forms a continuous porous structure with the sintered nanoparticle material within the pores of the base material. Alternating layers or nanoparticles with differing shapes, sizes and composition may be built up by sequencing the deposition steps, or by repeating deposition steps after sintering. The amount of nanoparticle powder in the pores of the base, or the thickness of the fine nanoparticle layer on the surface of the base, may be varied by the nanoparticle deposition to control the pressure drop and retention characteristics of the final sintered porous composite material. Preferably the sintered porous nanoparticle layer on top of the porous substrate has a thickness less than 1000 microns, preferably less than 500 microns, and more preferably less than 100 microns and even more preferably less than about 10 microns. Multiple layers of nanoparticle material may be formed with the porous base, and each layer may have a different material composition or nanoparticle size. The thickness of the porous composite material includes the porous base material and the sintered porous nanoparticle material layer. The thickness of the porous composite material may be varied to alter pressure drop or retention by changing the thickness of the porous base and or the sintered porous nanoparticle material layer.

It is preferably that the pores of the sintered porous composite material be smaller than the porous base material. Preferably this sintered porous composite material comprises nanometer or sub-nanometer sized pores throughout the sintered porous nanoparticle material layer and the sintered nanoparticle material within the pores of the base material. The pores may be characterized in that they provide particle retention by sieving and have an LRV greater than 2 for of 0.2 micron or larger particles, preferably an LRV or greater than 4 for 0.2 micron or larger particle; more preferably an LRV of greater than 2 for 0.05 micron or larger particles, and most preferably an LRV of greater than 4 for 0.05 micron or larger particles. The pores of the sintered porous nanoparticle material, which permit a flow of fluid through the pores, may also be characterized their smallest aspect is less than about 1000 nanometers, preferably less than about 200 nanometers, and more preferably less than about 50 nanometers.

Figure 3:
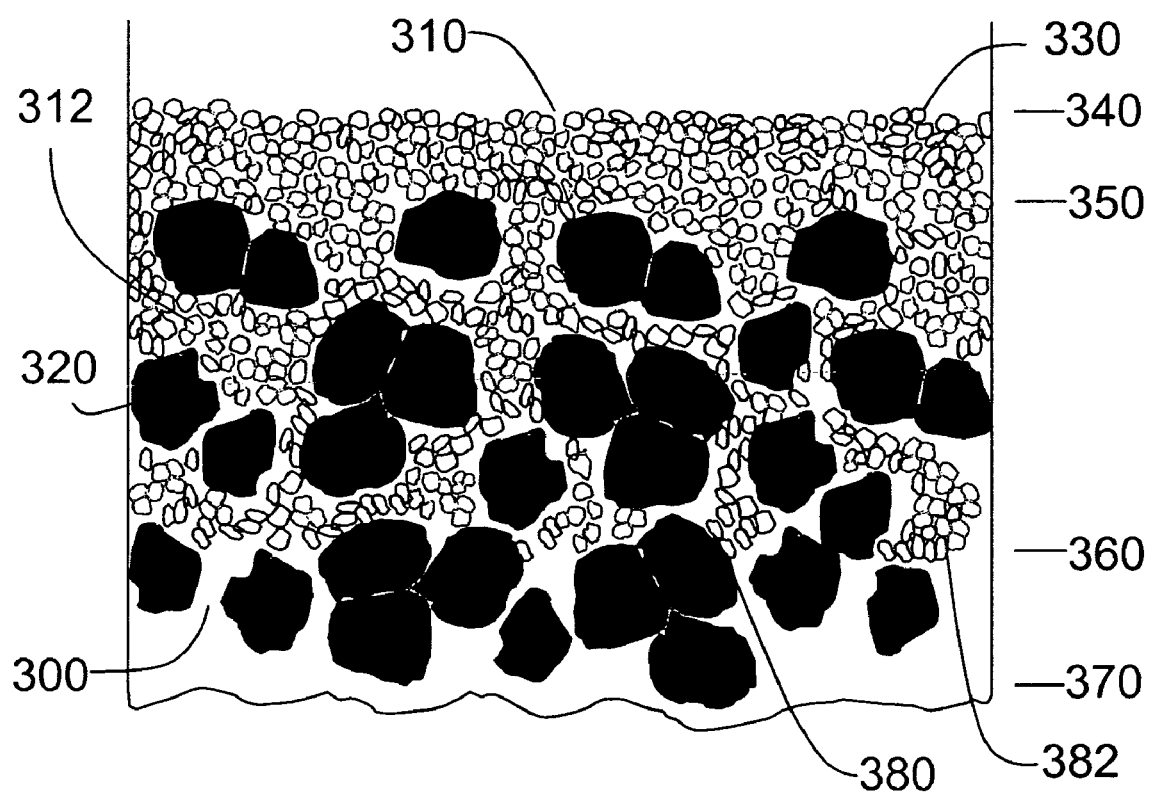
FIG. 3 is a illustration of the cross section of a sintered porous composite material of the present invention.

The density of the sintered porous nanoparticle material layer, for example as illustrated by the material from 340 to 350 in FIG. 3, on top of the one or more surfaces of the porous base preferably provides a sufficient contact surface area for catalysis, gas sensing, fluid filtration, or a combination of these and minimizes the pressure drop across the sintered porous composite material. This sintered porous nanoparticle layer on top of the porous substrate has a thickness less than 1000 microns, preferably less than 500 microns, and more preferably less than 100 microns and even more preferably less than about 10 microns. The density of the sintered porous composite material may be characterized in that has an LRV of at least about 2, for about a 0.2 μm diameter PSL bead particle challenge in water by sieving, preferably an LRV of at least about 4 for about a 0.2 μm diameter PSL bead particle challenge in water by sieving, more preferably an LRV of at least 2 for a 0.05 μm diameter PSL bead particle challenge in water by sieving and even more preferably an LRV of at least 4 for a 0.05 μm diameter PSL bead particle challenge in water by sieving. The porous sintered composite material may be characterized by having a pressure coefficient in nitrogen gas of less than about 250 (psi cm²)/slpm, more preferably less than about 125 (psi cm²)/slpm, and even more preferably less than about 30 (psi cm²)/slpm. The sintered porous composite material is further characterized in that it is able to withstand a differential pressure across the membrane, the porous base providing support for the porous sintered nanoparticle material, of greater than 60 psi, and more preferably greater than about 400 psi. The density of the sintered nanoporous material layer, or fine layer, on the surface of the porous base can be in the range of from 3 to 6 g/cm³; for the porous sintered composite material with an LRV of at least 2 for 0.2 micron particles the density of the sintered nanoporous material layer is 3 to 4.5 g/cm³ and is preferably from about 3.8 to 4.2 g/cm³; for the porous sintered composite material with an LRV of at least 2 for 0.05 micron particles the density of the sintered nanoporous material layer is 4.5 to 6 g/cm³, and is preferably from about 5 to 5.5 g/cm³

Without wishing to be bound by theory, the sintered porous composite materials of the present invention may be characterized by the pressure loss across the membrane which may be related by a proportionality constant K (the pressure coefficient) to the area of the membrane, the thickness of the membrane, the size, shape, and distribution of pores in the membrane, and the flow of fluid through the membrane. Using the relationship (1):

$$\Delta p = K\left(\frac{Q}{A}\right) \quad (1)$$

where K is the pressure coefficient, Q is a nitrogen gas flow (slpm), and A is the area of the membrane (cm²), and Δp is the pressure drop (psi); the porous composite material of Example 2 has a K value of about 13.5 (psi·cm²)/slpm and the porous composite material of Example 9 has a K value of about 21.5 (psi·cm²)/slpm. One skilled in the art would know that the porous composite material membrane properties such as but not limited to the area of the membrane, the thickness of the membrane, the size, shape, and distribution of pores in the membrane, and the viscosity of fluid through the membrane may be changed to affect the proportionality constant K. For example, the thickness of the sintered porous nanoparticle material layer (which is approximately linearly related to pressure drop) may be increased or the porosity of the porous sintered nanoparticle material layer decreased to provide a membrane with greater resistance to the flow of fluid, and as a result, a higher pressure coefficient. Although the porous composite materials of the present invention are not limited by any value of the pressure coefficient, porous composite materials of the present invention may preferably have pressure coefficients in nitrogen gas of less than about 250 (psi cm²)/slpm, more preferably less than about 125 (psi cm²)/slpm, and even more preferably less than about 30 (psi cm²)/slpm.

The sintered porous composite material includes a porous base material and a layer of porous sintered nanoparticle material on top of one or more surfaces of the porous base material and penetrating a portion of the base material to form a continuous structure with a sintered porous nanoparticle material within the pores of the base. The layer of porous sintered nanoparticle material may be on one or more surfaces of the porous base and penetrates a portion of the porous base material to form a porous and preferably a nanoporous material with the pores of the base material. It may be used for flowing a fluid through for catalysis, as part of a sensor, removing particles or contaminants from the fluid or a combination of these. The porous sintered nanoparticle material may be characterized in that its pores are smaller than the pores in the porous base material. The sintered porous composite material may be further characterized in that is has an LRV of at least 2 for a 0.2 μm PSL bead particle challenge in water by sieving, a pressure coefficient in nitrogen gas of less than about 250 (psi cm²)/slpm, more preferably less than about 125 (psi cm²)/slpm, and even more preferably less than about 30 (psi cm²)/slpm. The sintered porous composite material can support a differential pressure across the material of greater than 60 psi. The sintered porous composite material has an LRV of at least 2 for a 0.2 μm particle challenge in water, preferably it has an LRV of at least 2 for a 0.05 μm particle challenge in water by sieving; and even more preferably it has an LRV of at least 4 for a 0.05 μm particle challenge in water by sieving.

Porous composite materials of the present invention may also be made by isostatically pressing nanoparticles into a porous base frit or into an unsintered green form of a porous base material as illustrated in FIG. 1. The green form of the porous base material is made in a first step using methods well known in the art. The green form is then placed into a second container with dried nanoparticles which are the isostatically pressed into the green form. The mandrel supporting the green form may be porous and enable a flow of nanoparticles in a gas into the green form. As shown by the non-limiting illustration in FIG. 1, porous composite materials may be formed by isostatically pressing 180 powdered nanoparticles 130 into microporous and larger pore size 100 base materials 120 having a top surface 150 and a bottom surface 170. Preferably upon isostatically pressing 180 non-spherical shaped powders 130, the powders penetrate to a depth 160 and pack into the pores 100 of the base material and interlock with each other. The powdered nanoparticles may then be sintered or interbonded by interfusion to form a sintered porous nanoparticle material within the pores of the base. When used as a base material, a frit contributes less pressure drop to a sintered porous composite material filter element than microporous base materials due to the frit's larger pore size.

While the porous composite materials described herein may be used for particle removal and filtration, preferably they are sintered to bond the nanoparticle materials to improve their mechanical strength and prevent nanoparticles from being dislodged from the porous base. The porous base material containing entrained nanoparticles, or the porous base material containing entrained nanoparticles and nanoparticles on the one or more surfaces of the porous base material may be sintered in an oven to form sintered porous composite materials. For purposes of this description, the powdered nanoparticles material may be interbonded to one another by interfusion or equivalently sintered to one another, to form a porous sintered nanoparticle material as a layer atop the porous base or within the pores of the base. The green form with nanoparticles isostatically pressed into it may also be sintered in an oven. The sintering may be carried out in a reduced pressure environment, vacuum, a reducing gas environment (5% $H_2$ in argon), or other suitable gas environment for the sintering process. The sintering temperature, heating and cooling rates, and times for the sintering process will depend upon the materials sintered and may be changed to affect the final product pore size, strength, and surface area of the formed sintered porous composite material as would be obvious to those skilled in the art. The final sintered porous composite material may be treated one or more times with nanoparticles after sintering to build multiple layers of materials or graded porosities.

As shown in FIG. 3, a sintered porous composition including a porous sintered nanoparticle material 312 within pores of the base 320 and a porous sintered nanoparticle layer from 340 to 350 atop the base surface 350. The porous sintered composite material thickness extends from a side 370 of the porous base material 320 to a height 340 above a surface 350 of the porous base material 320. The porous sintered nanoparticle layer of material between 350 and 340 atop the porous base material 320 includes the nanoparticle material 330. The porous sintered nanoparticle material 312 penetrates a portion of the pores 300 of the base 320. The porous sintered nanoparticle material within the base pores 312 and the porous sintered nanoparticle material from 340 to the base surface 350 forms a substantially continuous structure. The porous sintered nanoparticle material layer includes interconnected pores 310 that are in fluid communication with and interconnected to the pores of the porous base 300. The porous sintered nanoparticle material in the pores of the base 312 may sintered to the base material 380, the nanoparticles may only sinter to each other whereby the sintered nanoparticle material mechanically interlocks with the interconnected pores in the porous base structure 382, or a combination of these. The powdered nanoparticles on the one or more surfaces of the porous base may sinter to the base material at its top surface 350, sintered nanoparticles, or sinter to both.

Preferably the porous composite material comprises nanometer and sub-nanometer sized pores 310 throughout the sintered nanoparticle material. The porous composite material may comprise layers of different nanoparticle materials such as size, shape, composition and combinations of these.

Figure 2:
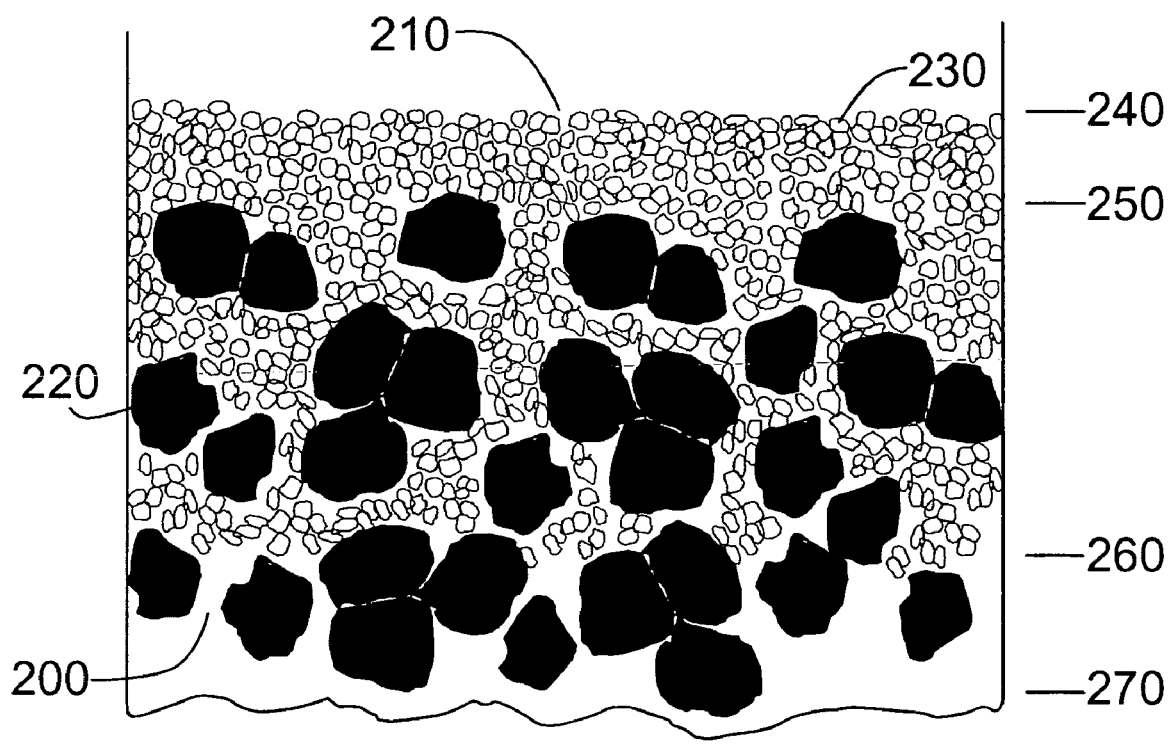
FIG. 2 is an illustration of a cross section of a powdered nanoparticle material following isostatic pressing of the powdered nanoparticle material into a porous base material to form a porous composite material.

The porous composite materials of the present invention form asymmetric structures. FIG. 2. is an illustration of a cross section of a porous composite material with an asymmetric structure formed by isostatically compressing powdered nanoparticles 230. This material includes a porous base 220, nanoparticles 230 within and penetrating at least a portion of the interconnected base pores 200 from the top surface 250 of the base to a depth 260, and a fine layer of nanoparticles with interconnected pores 210 from the top surface of the base 250 to a thickness or top surface of nanopowder material layer 240 above the base surface. The thickness of the porous composite material extends from a side 270 to the top surface of the nanopowder material layer 240. The pores 210 of the powdered nanoparticles are in fluid communication with the base pores 200. This porous composite material may be made by isostatically pressing a powdered nanoparticle 230, for example but not limited to nickel, into a frit or a green form of a porous base material. Alternatively, the porous composite material may be made by flowing a source of powdered nanoparticle 230 in a fluid into a frit or a green form of a porous base material an capturing the powdered nanoparticles within the base pores 200 and on its surface 250. The porous composite material in FIG. 2 may be sintered to form the sintered porous composite material shown in FIG. 3.

Filter elements from the porous sintered composite material may be formed into a variety of shapes to control surface area, pressure drop, and mechanical strength. Shapes may include but are not limited to disks or tubes, pleated structures, or electrodes comprising the sintered porous composite materials of the present invention. These structures may be welded, compression fit, epoxied, fusion bonded to a thermoplastic, or otherwise fixtured or secured into a housing. The housing may be in the form of a tube, a canister, or other shape suitable for its intended use. The housing may comprise a void volume and a variety of inlet and outlet ports for fluid flow. The ports may be positioned about the housing as required for its use and the ports may include but are not limited to metal seals, compression fittings, barbs, or welded fittings. The fluid may then be made to pass through the housing comprising the sintered porous composite material element for filtration, purification, catalysis, sensing, or combinations of these.

Figure 6:
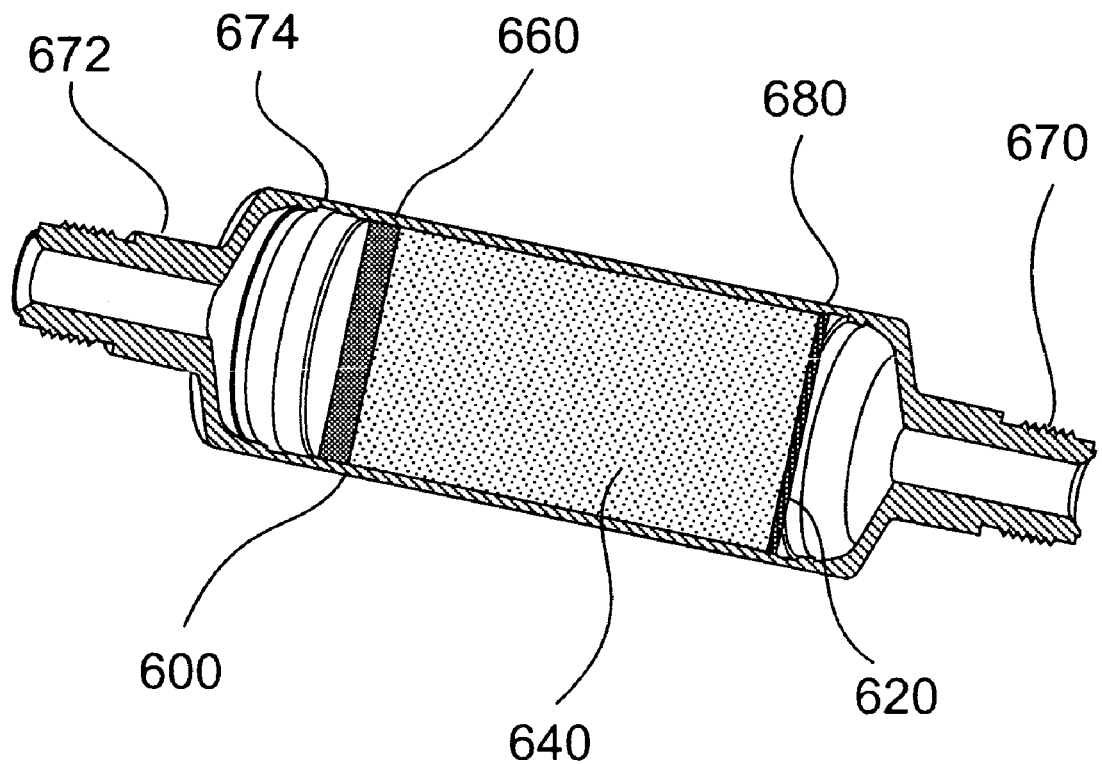
FIG. 6 is a schematic illustration of a packed bed device of the present invention comprising a coarse inlet filter element, a packed bed of materials to provide depth filtration and or purification, and an outlet sintered porous composite filter element of the present invention.

In one embodiment of the present invention, one or more sintered porous composite material elements or other porous filter elements may be welded or press fit into a housing which further comprises a bed material as shown schematically in FIG. 6; preferably the porous sintered nanoparticle material layer of the sintered porous composite filter element has pores which are nanometer sized. The housing and the element may be covered with a bed of material that further effects particle and or contaminant removal from fluids which flow through the bed material.

The sintered porous composite materials of the present invention may be bonded or joined to one or more housing members which provide an integral seal with the housing members while retaining the pore structure and size of the sintered porous nanoparticle material within the base and the sintered porous nanoparticle layer on the surfaces of the base in the sintered porous composite material. The sintered porous composite material filter element and the one or more housing members may be joined by press fitting, compression fitting, a metal seal, welding, or by use of a graded seal using a polymer or glass. Heating of a sintered porous composite material filter element to form such a seal, for example a glass to metal seal or a weld, with one or more housing elements may result in localized heating of the sintered porous composite material element and fusion or melting of the entrained or sintered nanoparticles within the porous composite material. The area of the sintered porous composite material between the porous composite material and one or more housing members with which it is to be bonded, may if necessary be further be sealed, impregnated, or filled to reduce particle penetration through pores in these areas. Preferably the filling, impregnation, or closure of these pores provides a substantially uniform particle retention across the sintered porous composite material joined to the housing as determined by a mean pore flow test and shown by a sharp transition between diffusive flow and bulk flow in a bubble point test. The pores near the interface of a weld or glass seal area may be impregnated, closed, or filled by a variety of techniques as would be known to those skilled in the art including but not limited to mechanically sealing the membrane in the area near where the porous composite material is heated, use of a gasket or o-ring at the area near where the porous composite material is heated; use of high heat capacity gas such as helium to cool the heated site and prevent fusion of the entrained nanomaterials, use of adhesives or polymers to physically seal the heat treated areas, or impregnation of nanoparticles into the porous composite material in the heat treated area.

Examples of suitable bed materials include but are not limited to powders, fibers, fiber mesh, aerogels, foams, woven matrices, flat sheet membranes, depth filtration media, and combinations of these. Suitable bed materials include but are not limited to chemically compatible metals, metal alloys, chemically reactive or chemically functionalized particles, metal oxides or hydroxides, ceramics, polymers, salts, carbon comprising materials, semiconductors, and combinations of these. Bed material examples include Ni powder, like INCO type 255, 316 L stainless steel powder, alumina powder, silicon nitride powder, quartz fibers, and polytetrafluoroethylene powder. The particle size of the bed material should suitable to provide a void free packing and sufficient particle or contaminant removal in the interstices in the bed. Particle sizes for the bed material may range from 3 millimeters to 0.2 microns. For some applications, such as supercritical fluids, bed particles may have a size in the range of 0.2 µm to 30 µm diameter, fibers may also have diameters in the range of 0.2 µm to 30 µm and lengths of from 0.2 microns to 3 millimeters. The distribution of particle size or shape will depend upon the characteristics of the bed; for graded beds a large particle size, material composition, and or shape may be use. For other beds a particle distribution may be for example but not limited to 5% rms of the particle diameter.

Bed materials may be chosen for their ability to remove contaminants from the fluid. Examples of molecular contaminants can include water, metals, and organics. For example, supercritical carbon dioxide can become contaminated with hydrocarbons from pumps and the apparatus. In the semiconductor industry it is highly desirable to remove any hydrocarbon from fluids used to clean or react with wafers. Materials useful for removing these contaminants may be adsorptive materials like zeolites, alumina, carbon and activated carbon beds for removal of hydrocarbons. Other materials include those disclosed in U.S. Pat. No. 6,361,696 the contents of which are incorporated herein by reference in their entirety. The removal of contaminants from the fluid may be determined off-line using techniques known to those skilled in the art. For example gas chromatography utilizing a flame ionization or electron capture detector may be used for measuring hydrocarbon and carbon monoxide concentration in fluids below 1 part per million, total residues in the fluid may be measured to nanogram levels utilizing a quartz microbalance or surface acoustic wave device on a suitably concentrated fluid sample; moisture may be determined utilizing commercially available electrolytic moisture analyzers, metals may be determined utilizing ICP-MS on concentrated samples with nitric acid. The methods and materials disclosed in SEMI C3.57-0600 may also be used in the analysis of carbon dioxide gas and residues from the concentration of contaminants or purified fluids.

Figure 7:
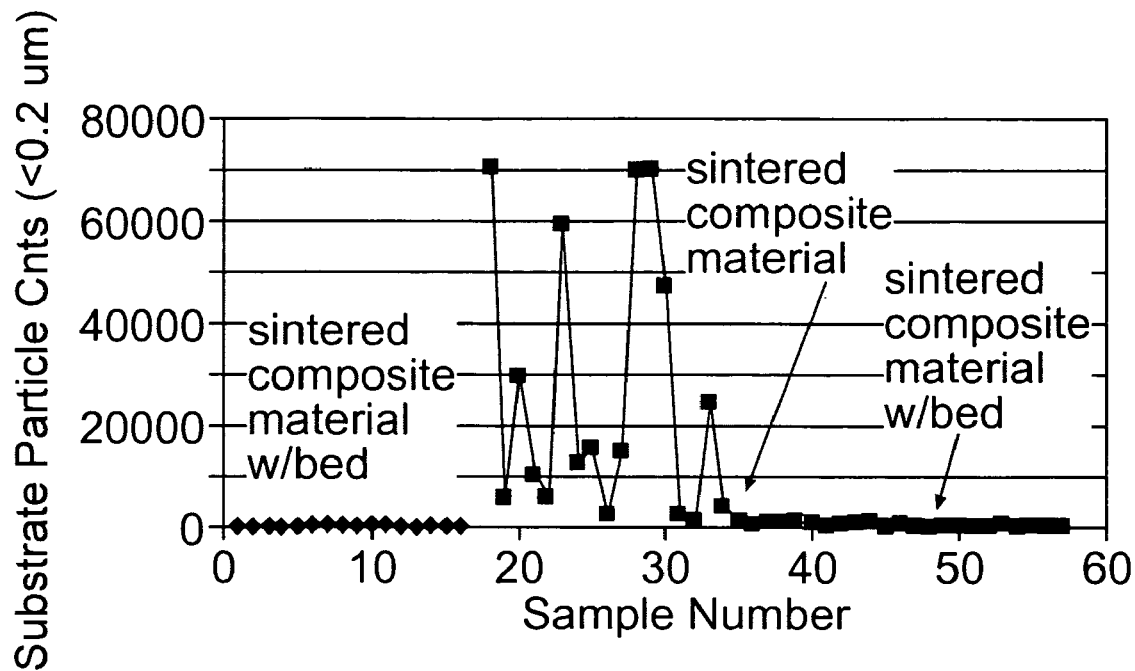
FIG. 7 is data illustrating the reduction in particle counts on substrates using the porous sintered composite filter element and pack bed embodiments of the present invention to remove contaminants from a supercritical fluid. The particle counts are for particles >0.2 micron on a substrate determined using a KLA-Tencor surfscan. The results are for 200 mm substrates and cleaning is performed using about 5 liters of supercritical $CO_2$ per run.

Preferably the amount of hydrocarbon in a fluid treated with an apparatus of the present invention, for example supercritical carbon dioxide, is less than about 100 parts per billion (mole/mole) and the amount of moisture is less than about 100 parts per billion (mole/mole) based on the analysis of a gaseous sample of the fluid. Embodiments of the present invention may be used to remove particles from supercritical fluids such as but not limited to carbon dioxide. As shown in FIG. 7, the porous composite material and the porous composite material with a packed bed of material such as described in Examples 2 and 6 may be used to reduce the number of particles on a substrate cleaned with supercritical $CO_2$. Preferably the number of particles greater than about 0.2 micron in size remaining on a substrate cleaned with a about 5 liters of supercritical carbon dioxide fluid filtered with a sintered porous composite material or a device including a sintered porous composite material element of the present invention and a packed bed of material is less than about 300 counts on a 200 mm Si wafer, and more preferably less about 100 counts on a 200 mm Si wafer as measured by light scattering measurements of the treated substrate.

The void volume of the housing is filled with bed material and packed to a density sufficient to capture particles and contaminants from a fluid to be treated and to also prevent voids, bypass, and prevent restricted fluid flow or pressure drop. The bed may be packed for example by pressing, vibrating, or tamping the bed material in the housing having a first filter element in place. Packing densities may range from 1 to 90%. Graded or mixed beds comprising different bed materials, different material morphology, different size, and combinations of these may be used. All or a portion of the void volume may be filled with the bed material and a second filter element bonded or press fit into the housing to secure the bed material. The device including a sintered porous composite material filter element with a layer of porous sintered nanoparticle material having nanometer sized pores and a bed of material for contaminant removal has an LRV of at least 2 for 0.2 µm particles, preferably an LRV of at least 4 for 0.2 µm particles, more preferably an LRV of at least 2 for 0.05 µm particles, and most preferably an LRV of at least 4 for 0.05 µm particles in water and a pressure drop in water of less than 500 psi/slpm; preferably less than about 50 psi/slpm; and most preferably less than about 5 psi/slpm for a 15 $cm^2$ sintered porous composite filter element. One skilled in the art could determine the bed material and packing density required to effect a required pressure drop at a given fluid flow rate using flow meters and pressure gauges; particle removal from fluids used to clean substrates could be determined by laser surface scanners.

As illustrated in FIG. 6, one embodiment of the present invention includes a housing 600, a second filter element or frit 620, a bed material 640, and an first filter or frit 660. The second filter element 620 may be made for example a using a porous metal filter element with the pore size of the element less than about 20 microns as is described in U.S. Pat. No. 5,487,771 the teachings of which are incorporated by reference herein in their entirety. Preferably the second filter element 620 is a porous composite material, more preferably 620 is a sintered porous composite material having a sintered porous nanoparticle material layer with nanometer and or sub-nanometer sized pores. The second filter element 620 may be welded 680 between two metal parts, preferably stainless steel parts, and more preferably materials such as but not limited to 316L or Hastalloy. One of the metal parts may be a tube used for a housing 600 and has an end for welding or bonding to the second filter element 620 while the second part may be a fluid connection 670. The fluid connection 670 may consist of but is not limited to various pipe fittings, a tube stub for welding, a compression fitting, or as shown in FIG. 6 a fluid fitting 670 such as a ¼" "VCR" male type fitting. The fluid connection 670 also has an end for welding or bonding to a the second filter element 620. The length, diameter and shape of the housing 600 define the volume of the bed as shown in FIG. 6. The housing 600 for the bed 640 may be any acceptable shape or volume. The second filter element 620 fits between the two metal parts and the three are welded or bonded 680 into one solid subassembly. The subassembly may then be filled with a fine powder or bed material 640 that is preferably a nickel powder with particles ranging in size from about 0.2 to 30 microns in diameter vide supra. The powder is tapped and or vibrated and packed into the bonded subassembly until the desired weight and or packing density of the bed powder 640 is achieved. The desirability of a packed bed of powder 640 may be determined by its pressure drop and or contaminant retention; lower pressure drop being achieved for example by lower packing density of the bed, shorter bed length, and larger diameter beds; higher contaminant retention being achieved with higher packing densities and longer beds. Once the bed of powdered material has been formed in the sub-assembly, then, a first open porous metal structure or filter 660 with a suitable pore size, of for example of about 20 microns or greater, is pressed, welded or bonded 674 into the subassembly to hold or retain the bed material 640 in place. Finally, a fluid fitting 672 having one end for bonding to the first filter 660 and housing 600 and a second end for connection to a fluid fitting as described previously, is welded 674 to the subassembly as illustrated in FIG. 6. In one embodiment, the second filter element 620 may be made by first welding into the housing 600 a base filter element which may be subsequently treated by impregnation, entrainment, or penetration with a powdered material, preferably a powdered material comprising nanometer size particles, to form the second filter element as a porous composite material having nanometer sized pores. Optionally, the base filter 620 element may be covered with a nanoporous membrane (a membrane having nanometer size pores) to form the second filter element having nanometer sized pores.

Embodiments of the present invention can be used for filtering and or purification of a wide variety of fluids including supercritical fluids and liquids. In some applications it may be desirable to separate the sintered porous composite filter element from the purification bed and place them into separate housings fluidly connected to one another by a conduit. Such an arrangement makes replacement of one component or regeneration of it easier and less costly. The materials of construction of the device may be chosen to make them useful for filtration or purification over a wide range of temperatures under which the sintered porous composite materials and or bed materials are thermally and mechanically stable. For example, liquid helium, liquid nitrogen, liquid carbon dioxide, as well as heated liquids may be filtered or purified with embodiments of the present invention. Preferably the temperature of the liquid or fluid does not alter the mechanical properties or pore size of the sintered porous composite material filter or bed material. Preferably the temperature is below about 300° C. The wide range of thermal stability of the elements of the present invention also permits fluids having a wide range of viscosities to be treated. The viscosity of the fluid may be that which gives an acceptable fluid flow and pressure drop for the filter and bed material in the application. In some cases the viscosity of a liquid may be reduced by heating followed by filtration or purification. A method for removing contaminants from a fluid includes providing device with a sintered porous composite element and a bed of material in a housing as shown in FIG. 6, and flowing a fluid with contaminants, such as but not limited to hydrocarbons, moisture, particles, or a combination of these through the device to remove one or more contaminants and particles from the fluid.

In part, the following non-limiting examples and data illustrate various embodiment and features relating to the compositions, methods, and components of the present invention. While various aspects of the practice and use of this invention are illustrated by these examples and by the components and processes used, it will be understood by those skilled in the art that substantially comparable results may be obtained with various other reagents, apparatus and processes which are commensurate and within the scope of the embodiments of this invention.

EXAMPLE 1

This example illustrates the formation of a composite porous materials using an aerosol to entrain nanoparticles into the porous base materials.

Number 1: disc: The porous base substrate material was a sintered 255 nickel disc, diameter: 1.5", thickness 0.1", porosity 51.5%, bubble point in water was 15 psi, and which had an 11.5 psi differential pressure loss at 15 slpm air flow. The membrane had a starting mass of 18.103 grams and was fixtured for aerosol treatment. Treat fixtured membrane with 60 nm nickel nanoparticle aerosol (approx. challenge: 2E+07 particles/min) at 15 slpm air flow rate for 14.5 hours to form a porous composite material. The resulting product was sintered at 600° C. for 45 minutes in 5% $H_2$/Argon. The mass of the sintered porous composite product was 18.116 grams and had an 13 psi differential pressure loss at 15 slpm air flow. The bubble point of the formed sintered porous composite material in water was about 15 psi.

Number 2: tube: The porous base substrate material was sintered 255 Ni tube, 1.38" long, OD 0.635", wall thickness 0.065", porosity 64%, bubble point in water 10 psi, and which had a 7.5 psi differential pressure loss at 30 slpm in air flow. This tube was welded into "sub-assembly" and had a starting mass of 38.6965 grams. This sub-assembly was treated with 60 nanometer diameter nickel aerosol (approx. challenge: 2E+07 particles/min) for 48 hours at 20 slpm nitrogen flow rate. The resulting porous composite material product was sintered at 575° C. for 40 min 5% $H_2$/Argon to form the sintered porous composite material. The mass of the sintered porous composite material product was 38.722 grams and had an 8.0 psi differential pressure loss at 30 slpm nitrogen flow. The bubble point of the formed sintered porous composite material in water was 11.5 psi.

Number 3: tube: The porous base substrate material was a sintered 255 Ni tube, 1.38" long, OD 0.635", wall thickness 0.065", porosity 54%, bubble point in water was 15 psi, and which had a 12 psi differential pressure loss at 30 slpm in air.

This tube was welded into "sub-assembly", and had a starting mass of 39.4557 grams. The sub-assembly was treated with an aerosol as above but with 210H Ni powder for 7 hours at 20 slpm nitrogen gas flow. The resulting porous composite material product was sintered at 560° C. for 35 min 5% $H_2$/Argon. The mass of the sintered porous composite material product was 39.469 grams; and had a 13 psi differential pressure loss at 30 slpm flow of nitrogen. The bubble point for the sintered porous composite material in water 15.5 was psi.

EXAMPLE 2

This example shows how a porous composite material may be made using the isostatic method which is then sintered to form a sintered porous composite material. An example of such a sintered porous composite material is illustrated schematically in FIG. 3.

Figure 4:
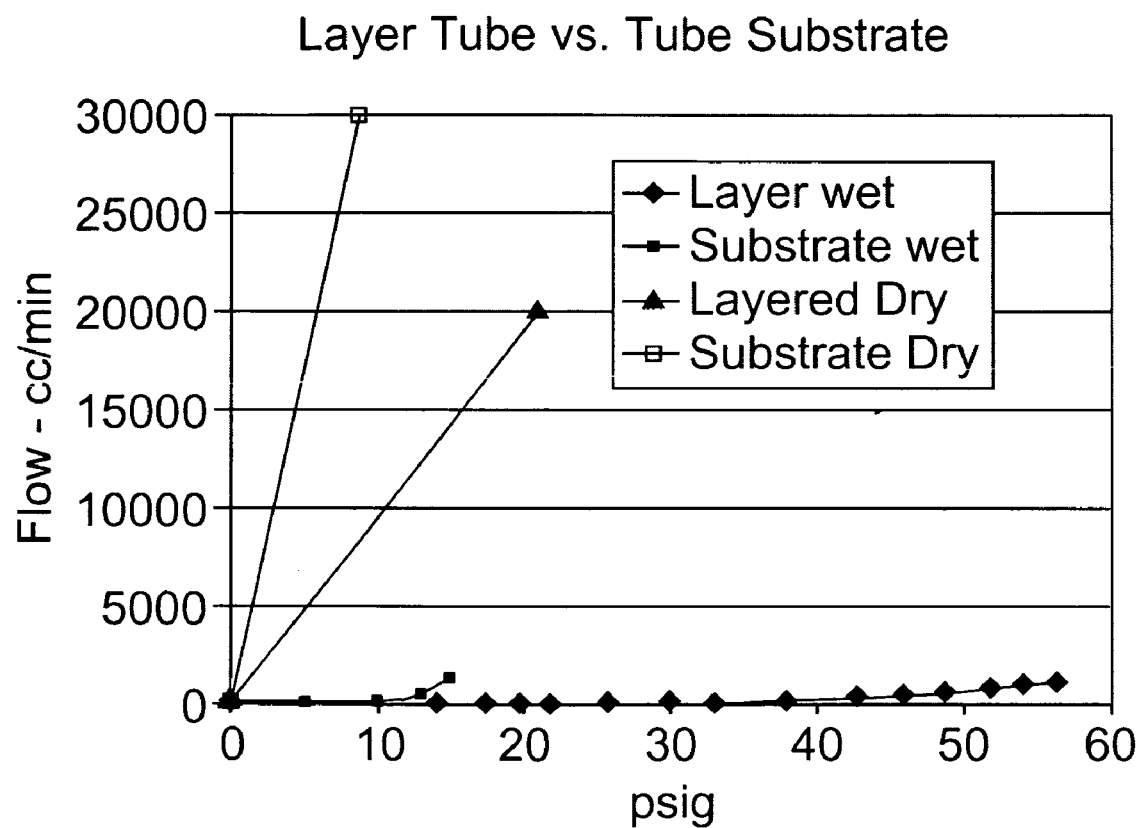
FIG. 4 is a plot comparing the Flow delta P and the bubble point for a sintered composite porous material made by isostatically pressing a nickel nanoparticle powder into a green form of Example 2 and sintering.
Figure 5:
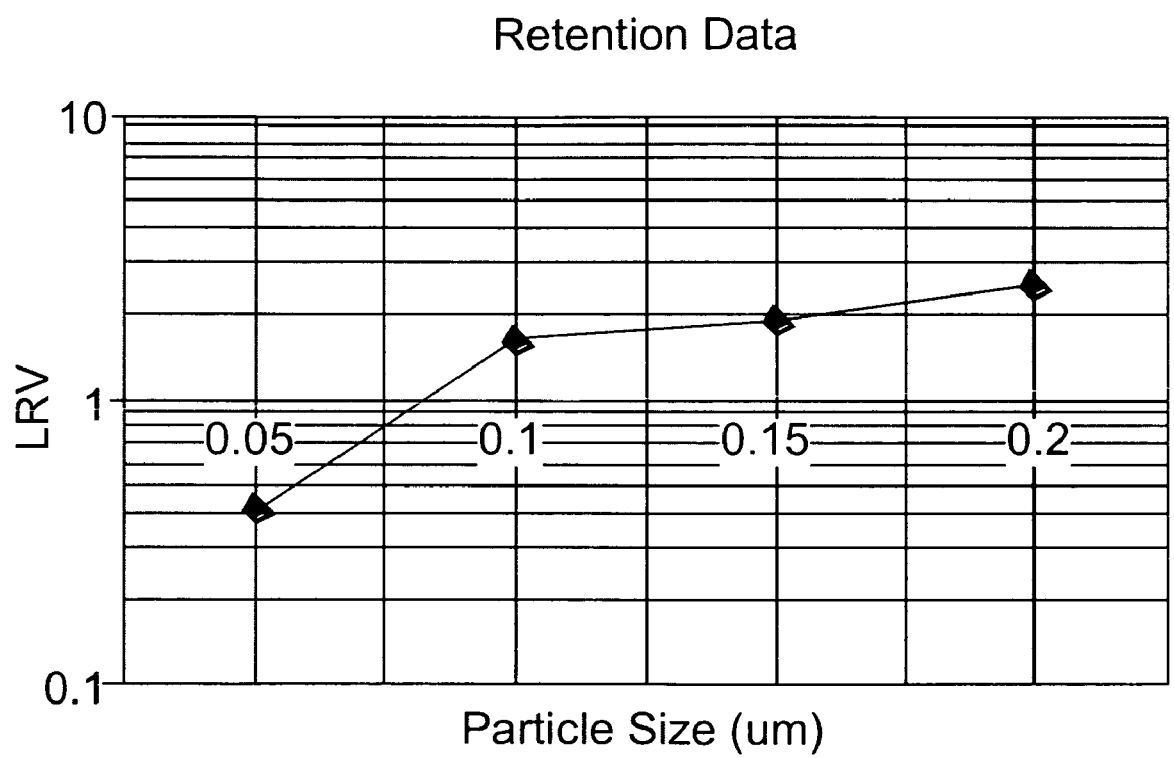
FIG. 5 is a plot illustrating the particle retention of PSL beads in water by the sintered porous composite material made by isostatically pressing a nickel nanoparticle powder into a green form of Example 2 and sintering.

A mold with ID 0.850" and 7" long and a steel mandrel 0.550" diameter was filled with 45 grams of 255 Nickel powder, Fisher size (2.8 microns). This was isostatically pressed at 500-1000 psi. The dimensions of this green form were: OD: 0.708", ID 0.550", length 7". The green form and mandrel was carefully placed into a new mold with ID: 0.800". This mold was filled with 9.5 grams of 210H nickel powder (Fisher size 0.3 microns) and isostatically pressed at 500-1000 psi. This layered green form (dimensions: OD: 0.745", ID 0.550" length 7", weight: 54.5 grams), was sintered in vacuum and a reducing atmosphere 5% $H_2$ in Argon at 575° C. for 30 minutes. The sintered porous composite tube had a final OD: 0.685" and total wall thickness: 0.082" (fine layer approx. 0.005-0.015 inches or 127-381 micrometers). The tube was cut into individual tubes: Length: 1.38", Weight: 11 grams, density was 3.13 grams/cc. Gas flow testing of the dry cut sintered porous composite tubes showed that they had a 21 psi differential pressure drop at a gas flow rate of 30 slpm of air. FIG. 4 shows the pore symmetry test results of this sintered porous composite tube; its bubble point was approximately 50 psi in $H_2O$. FIG. 5 shows that the particle retention of the sintered porous composite tube is at least 2 LRV for a 0.2 micron sized particle. The fine layer as illustrated for example between 340 and 350 in FIG. 3, typically has a density of between 3.0-4.5 g/cc and is preferably around 3.8-4.2 g/cc (52-57% porous). The porous base substrate, for example 120 in FIG. 3, is typically around 64% porous, but may range from about 60 to about 70%.

Figure 10:
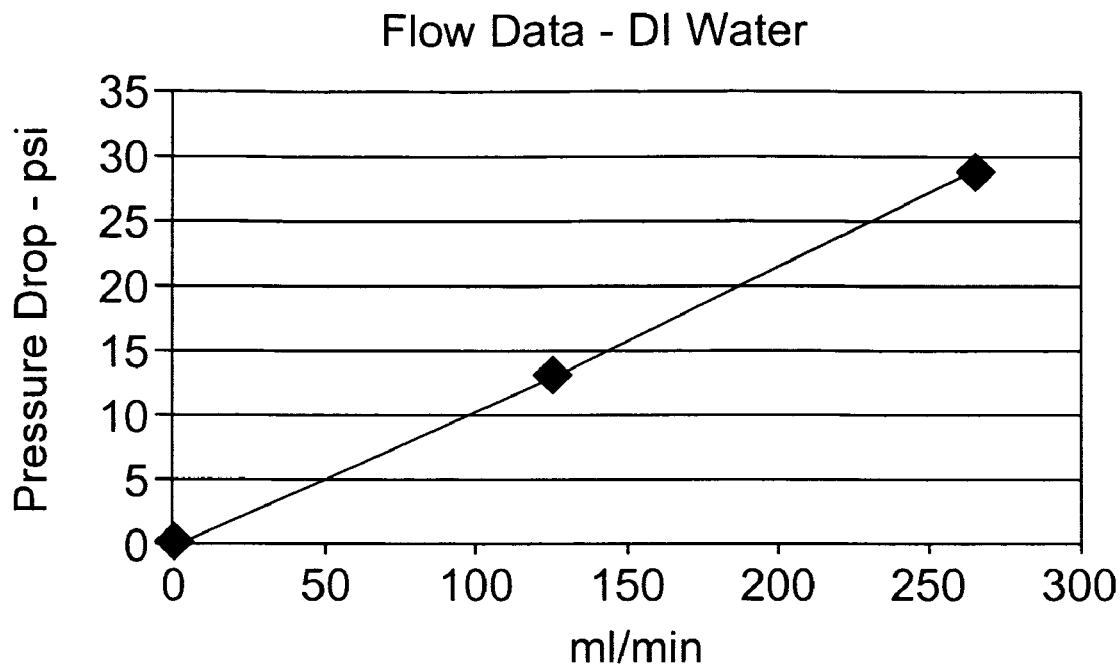
FIG. 10 is a plot of the pressure drop versus flow rate using water as a fluid for a sintered porous composite material filter element of the present invention welded into a housing where the edge of the weld area was sealed.
Figure 11:
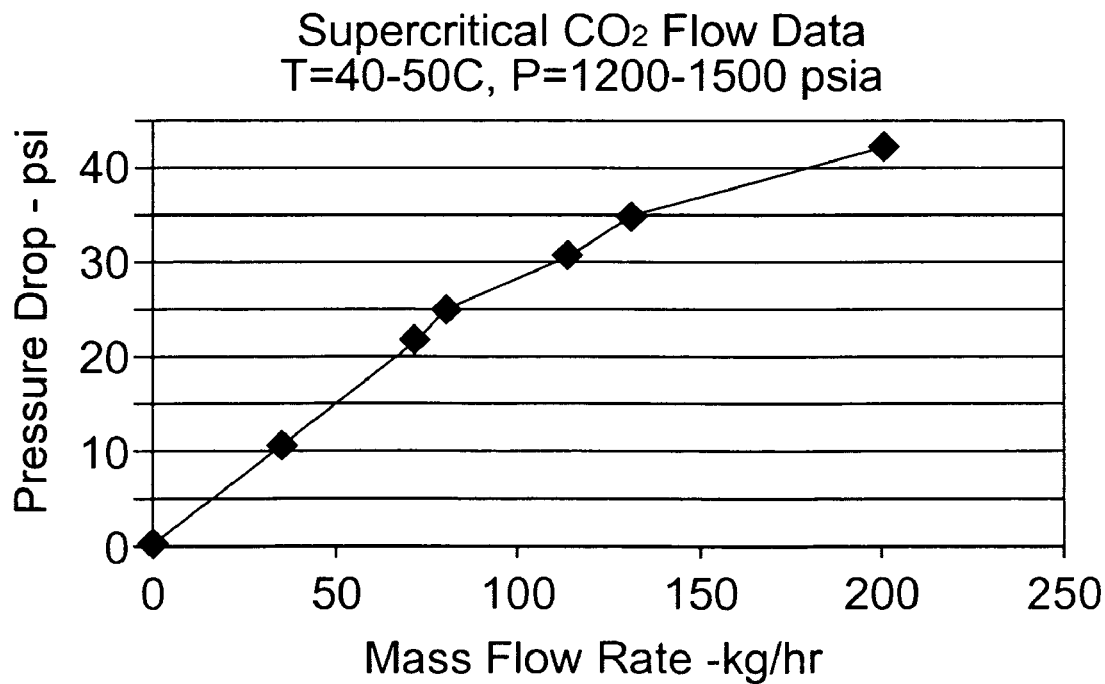
FIG. 11 is a plot of the pressure drop versus flow rate using supercritical $CO_2$ for a porous sintered composite material filter element of the present invention welded into a housing where the edge of the weld area was sealed.

Liquid particle retention, as shown in FIG. 5, was measured by determining the number of particles captured by sieving, i.e. the particles are captured by the sintered porous composite membrane only if they are larger than the porous composite membrane's pore. The liquid retention test was performed in DI water using a challenge of PSL beads of known size. The PSL bead mixture is diluted 1:100 by volume. Triton® surfactant was added, for example 20% by volume, to remove surface charges from the PSL beads and permit sieving retention of the membrane to be determined. For example, 40 microliters of 0.137 micron PSL beads is added to 4,000 microliters of water containing 20% Triton® to prepare a particle test solution. The water test flow rate through the sintered porous composite membrane was set to 140 ml/min and optical particle counters capable of measuring 0.03 to 0.2 micron size particles were used to measure particle concentration and size. The particle concentration of the PSL bead/surfactant solution is measured before the sintered porous composite membrane filter was placed on the test stand. Prior to challenging the filter, the background counts were recorded. The pressure drop as a function of water flow rate through this sintered porous composite membrane in water is shown in FIG. 10; its pressure drop as a function of flow in supercritical $CO_2$ is shown in FIG. 11.

EXAMPLE 3

This example illustrates the formation of a porous composite material using a slurry of nanoparticles in a liquid to entrain nanoparticles into a porous base material. The substrate material was a 255 Nickel sintered tube, 1.38" long, OD 0.635", wall thickness 0.065", porosity 54% porous that was welded into a "sub-assembly." The weight of the tube and subassembly was 39.6728 grams. The tube had a bubble point in water of 15 psi, and a 12 psi differential pressure loss at 30 slpm flow of air.

A mixture of 8 g off INCO Ni powder type 110 (ref 1.0 micron Fischer particle size) in 800 ml of IPA (for low surface tension) was prepared. This mixture was placed in a pressure vessel and the mixture forced to flow through the welded "subassembly" at 30 psig to "filter" 600 ml of the dispersion. The coated subassembly was "dried" by flowing air at 15 psi for 5 minutes through the coated subassembly, this porous composite material subassembly was then dried in air using an oven at 100° C. for ½ hour.

The dried subassembly was sintered at 525° C. for 1 hour. First 5 minutes of sintering was performed in vacuum, next 20 minutes 95% argon/5% hydrogen, and then balance of time (35 minutes) in a vacuum atmosphere. The sintered porous composite material subassembly was removed from the oven and test/measured. The mass of the added layer of nickel INCON powder was 2.144 g with a porous sintered nanoparticle layer thickness of approx. 300 micron and a porosity of approx. 54%. The bubble point of this sintered porous composite in water was 22 psi and it had a 17 psi differential pressure loss at 30 slpm flow of air.

EXAMPLE 4

In this prophetic example, the sintered porous material composition is going to be used as a membrane to filter a super critical fluid. Supercritical fluids are being used to replace a variety of organic and inorganic solvents used in industrial cleaning, purification and re-crystallization operations. The density of supercritical fluids is usually between 0.25 and 1.2 g/ml and is strongly pressure and temperature dependent. The solvent strength increases with density; changing the pressure or temperature enables the solvating properties of the supercritical fluid to be changed. Supercritical fluids can act as a carrier for co-solvents, like methanol, which can be added to supercritical fluids to tailor the solubility of various solids into the supercritical fluid carrier phase. Diffusion coefficients of solutes in supercritical fluids are ten-fold greater than in the corresponding liquid solvents, and are about three orders of magnitude less than the corresponding diffusion coefficients in the gases. The high diffusivity of solutes in supercritical fluids decreases the resistance to mass transfer of solutes into the supercritical fluid as compared to liquids. The surface tension of supercritical fluids is essentially like that of the gas and so supercritical fluid can flow into and through narrow pore or geometries with little pressure loss compared to liquids.

Water and carbon dioxide are common supercritical fluids used for extraction and their solvation properties. Supercritical water is a strong oxidant, especially when oxygen is dissolved into it, and is useful for oxidizing and eliminating toxins and organic compounds from waste media and substrates. Carbon dioxide, which is a super critical fluid above 31.2° C. and 1071.3 psi, is being used in cleaning and stripping operations for advanced integrated circuit manufacturing processes as well as food and beverage extraction processes. Because of its low surface tension and viscosity, supercritical $CO_2$ can easily flow into and clean trenches and vias in microelectronic devices. In addition supercritical fluids may be used in the manufacture of nanoscale biological and pharmaceutical materials such as proteins, DNA, various cells, and drugs in the form of an aerosol. In these applications, a filter capable of removing undesirable foreign matter, such as harmful spores and harmful bacteria, is highly desirable.

Systems utilizing supercritical fluids may operate in a closed loop. The supercritical fluid contacts the substrate or sample to be extracted or cleaned in a chamber, the substrate or sample may be removed from the chamber after cleaning, and the supercritical fluid containing the extracted material or particles is returned to a collection vessel. A sintered porous composite material with a pore size of about 10-200 nanometers made by the methods disclosed herein may be welded to a housing to form a filter element which may then be connected in fluid communication with the closed loop supercritical fluid system. The sintered porous composite material filter element in the housing may be used to remove contaminants like particles and dissolved materials from the fluid. The removal may comprise removing the one or more contaminants from the fluid by the sintered porous composite material by sieving filtration. Other such contaminant removal acts may comprise filtration, purification with a bed of a purifier material, and combinations of these acts to remove dissolved contaminants and or filter particles from the supercritical fluid before it is returned to the extraction chamber for further use. Other acts, such as changing the temperature and or pressure of the system may be used to affect the solubility of contaminants (e.g. cause precipitation) in the fluid and aid in the separation of contaminants from the supercritical fluid. After treatment, makeup gas or co-solvent may be added to supercritical fluid in the system. The use of the sintered porous composite material as a filter may be used to extend the useful life of the extraction fluid and may lead to cleaner substrates with reduced particle counts.

EXAMPLE 5

In this example a depth filter or purifier is made. The purifier consists of a sintered porous composite filter element such as the one described in Example 2 which is welded into a housing, the housing sized to be equal to or greater in length and diameter than the filter element. The void volume of the housing is filled with a Ni powder, like INCO type 255. Enough powder is placed into the housing to prevent voids and bypass, but not so much as to greatly restrict fluid flow.

FIG. 6 is an illustration of the depth filter of the example illustrating a housing, inlet filter 660, outlet sintered porous composite filter element 620, a packed bed of powdered material 640 between the filter elements, and fittings for connection to fluid flow circuit.

EXAMPLE 6

In this example a sintered porous composite metal filter element such as described Example 1 is welded between two stainless steel parts. One part (called the "outlet") consists of a short ¾" tube with a ¼" "VCR" male type fitting, the other is a ¾" tube 1" long which is the housing. The filter element fits between the two part and they are welded into one solid "subassembly."

The subassembly is then filled with a fine Ni powder. In this case, INCO type 255 with a particle size of 1-3 micron. The Ni powder is tapped and vibrated and packed into the subassembly until the desired weight of bed material is achieved. Then, an open porous metal structure with a pore size of 20 microns or greater is pressed into the subassembly to hold the powder in place. Finally, an inlet fitting similar to the already described outlet fitting is welded to the subassembly, resulting in a totally enclosed filter/purifier having a bed of nickel powder.

When 8 grams of Ni 255 are placed in the subassembly housing and sealed with an inlet fitting, the resulting bed has a density of 1.6 g/cc and a void volume of 84%. The pressure drop measured was 18 psi (1.2 Bar) at a flow of 2 slpm air with the outlet pressure at atmosphere.

When 16 grams of the Ni 255 are placed in the subassembly housing and sealed with an inlet-fitting, the resulting bed has a density of 3.2 g/cc and a void volume of 64%. The pressure drop measured was 64 psi (4.3 Bar) at a flow of 2 slpm air with the outlet pressure at atmosphere.

When 10 grams of Ni 255 powder was tapped into the subassembly housing and sealed with an inlet fitting, the resulting bed had a density of 1.30 g/cc and a void volume of 85%. The pressure drop measured in air was 52 psi at a flow of 2 slpm with outlet to atmosphere. This pressure drop is lower than the example above since the amount of bed material is less, resulting in a lower packing density.

Figure 14:
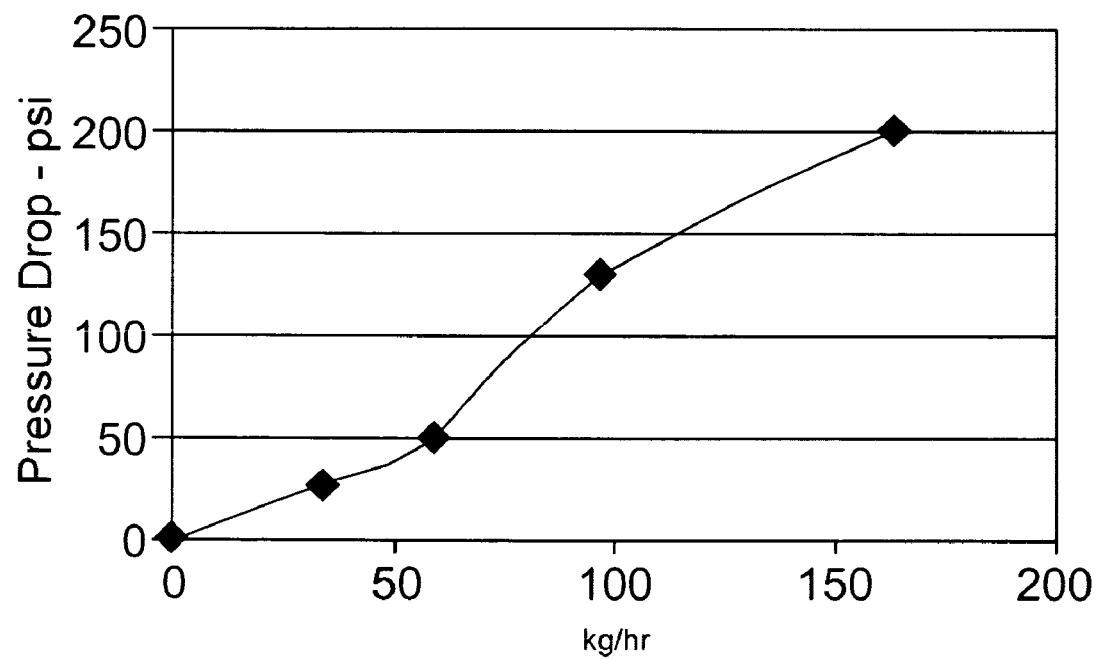
FIG. 14 is a graph illustrating the pressure drop versus mass flow rate of supercritical $CO_2$ for the porous sintered composite material filter element and the packed bed of material of Example 6.

A plot of pressure drop versus mass flow rate of supercritical carbon dioxide is shown in FIG. 14.

EXAMPLE 7

In this example, the sintered porous composite material filter elements of Example 2 and Example 6 were installed on a Supercritical $CO_2$ wafer cleaning tool and the particle concentration remaining on test wafers cleaned by the tool were measured. The particle data is for particles >0.2 micron using a KLA-Tencor surfscan. The results are for 200 mm diameter substrates and cleaning done using about 5 liters of supercritical $CO_2$ per run. In FIG. 7, the sintered porous composite material filter of Example 2 show the wafer counts on the wafer with just the porous filter element and the sintered porous composite material filter with a bed of material of Example 6 shows the particle counts when the present invention is used to filter the SC $CO_2$ fluid. The graph shows that sintered porous composite material filter of Example 2 results in fewer particle counts on the wafer and that the device comprising a packed bed of material of Example 6 also results in the reduction of particle counts on the wafer. Based on the graph the device of the present invention is capable of filtering supercritical carbon dioxide for cleaning a wafer that leaves less than about 300 particles with a size greater than 0.2 micrometers on the wafer when 5 liters of supercritical carbon dioxide are used.

EXAMPLE 8

Figure 8:
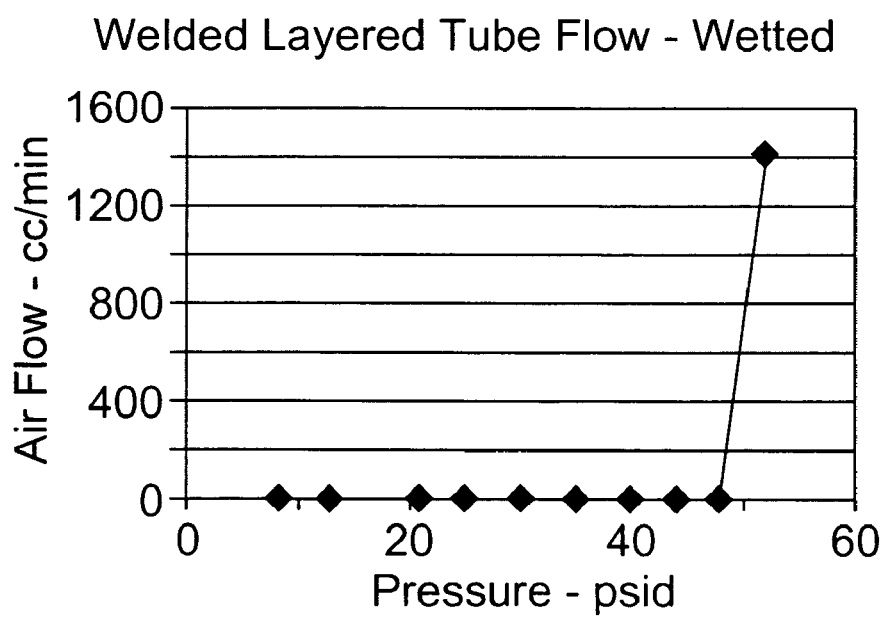
FIG. 8 is a graph illustrating the pore symmetry test in water of a porous sintered composite material filter element of the present invention welded into a housing where the edge of the weld area was sealed.
Figure 9:
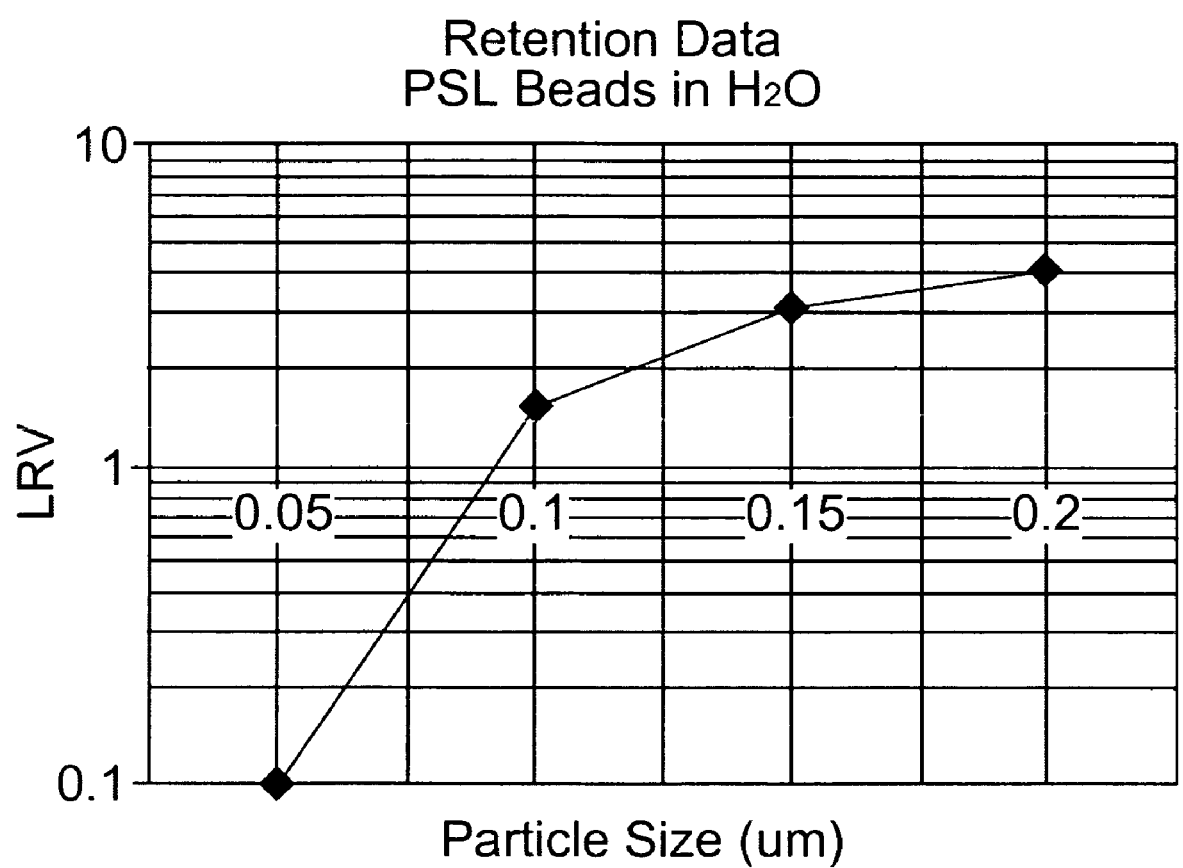
FIG. 9 is a graph illustrating the particle retention of PSL beads in water using a sintered porous composite material filter element of the present invention welded into a housing where the edge of the weld area was sealed.

In this example, a tube sintered porous composite filter element made as in Example 2 is welded into a housing and the interface area near the sintered porous composite material and the weld is sealed. The pore symmetry test for this filter element, FIG. 8, shows a sharp transition between the diffusive flow and bulk flow of gas. The particle retention of the welded and sealed filter element is about 4 LRV for 0.2 μm polystyrene latex beads in water as shown in FIG. 9.

EXAMPLE 9

Figure 13:
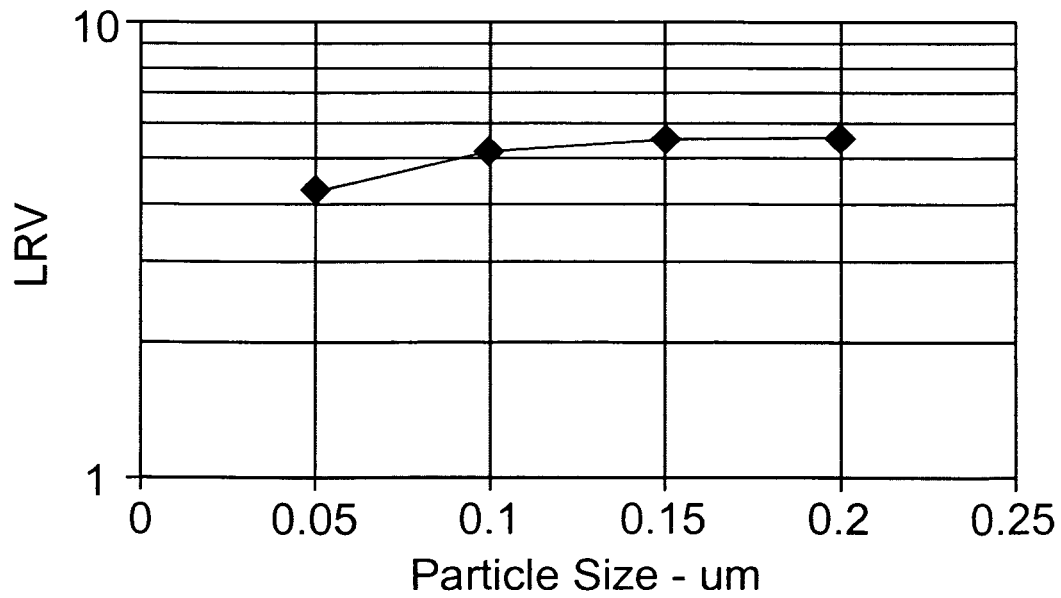
FIG. 13 is a graph illustrating the particle retention of PSL beads in water using a sintered porous composite material filter element of Example 9.

This example illustrates a sintered porous composite material of the present capable of removing 0.05 μm polystyrene latex beads in water as shown in FIG. 13, the porous sintered composite material made by the isostatic method.

A mold with ID 0.850" and 6" long and a steel mandrel 0.655" diameter was filled with 28 grams of 255 Nickel powder (Fisher size 2.8 microns). This was isostatically pressed at 5000-6000 psi. The dimension of this green form were: OD: 0.722", ID 0.655", length 6". The green form and mandrel was carefully placed into a new mold with ID: 0.800". This mold was filled with 7 grams of 210H nickel powder (Fisher size 0.3 microns) and isostatically pressed at 7000-8000 psi. This layered green form (dimensions: OD: 0.735", ID 0.655" length 6", weight: 35 grams), was sintered in vacuum and a reducing atmosphere 5% $H_2$ in Argon at 450-500° C. for 30 minutes. The sintered porous composite tube had a final OD: 0.685" and total wall thickness: 0.036" (fine layer approx. 0.003-0.006"). The tube was cut into individual tubes: Length: 1.38", Weight: 7.5 grams, density was 4.5 grams/cc. Gas flow testing of the dry cut tubes with a flow area of 16 $cm^2$ showed that they had a 27 psi differential pressure drop at a gas flow rate of 20 slpm of air.

Figure 12:
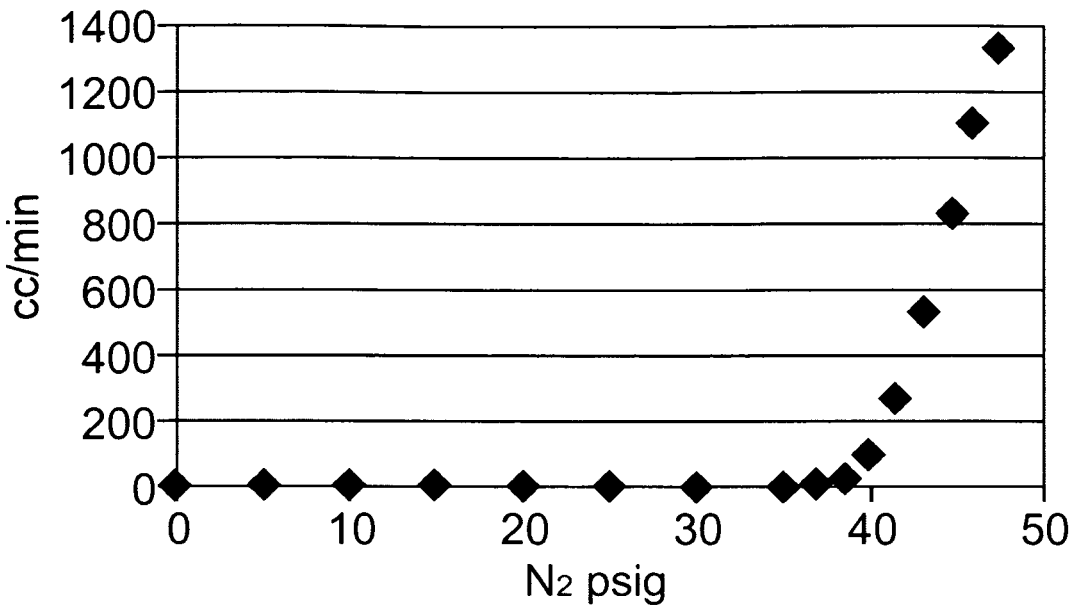
FIG. 12 is a graph illustrating the pore symmetry test of a porous sintered composite material filter element of Example 9.

The fine layer had a porosity of around 37% and the substrate around 51% (may range from about 45 to about 55%). Bubble point testing of this material was conducted in 60/40 IPA solution as shown in FIG. 12, Particle retention was conducted in DI water using PSL beads neutralized so the filtration mechanism was purely sieve type, the results of the particle retention testing are illustrated in FIG. 13 and show that the material has an LRV of at least 4 for 0.05 μm particles and an LRV of at least 5 for 0.2 μm particles.

Although the present invention has been described in considerable detail with reference to certain preferred embodiments thereof, other versions are possible. Therefore the spirit and scope of the appended claims should not be limited to the description and the preferred versions contain within this specification.

What is claimed:

1. A sintered porous composite material comprising:
   a porous base material of sintered metal particles; and
   a porous layer of sintered nanoparticle material sintered to the porous base material, said porous layer of sintered nanoparticle material on one or more surfaces of the porous base penetrates a portion of said porous base material, said porous layer of sintered nanoparticle material having pores with a largest dimension of less than 200 nanometers and wherein said porous composite material has a sieving LRV of at least 4 for 0.05 μm particles and a sieving LRV of at least 5 for 0.2 μm particles when challenged in water using PSL beads.

2. The sintered porous composite material of claim 1, wherein said porous layer of sintered nanoparticle material is comprised of metals, metal alloys, and mixtures of these materials.

3. The sintered porous composite material of claim 2, wherein said porous layer of sintered nanoparticle material is nickel, a nickel alloy, chromium alloy, a stainless steel.

4. The sintered porous composite material of claim 3, wherein said porous layer of sintered nanoparticle material includes sintered dendritic nanoparticles.

5. The sintered porous composite material of claim 1 further comprising: a gas, a liquid, a supercritical fluid or mixtures of these in the pores of said sintered porous nanoparticle material.

6. The sintered porous composite material of claim 1 further comprising a housing wherein said sintered porous composite material is bonded to said housing.

7. The sintered porous composite material of claim 1 wherein said material is further characterized by a pressure coefficient in nitrogen of less than 125 (psi $cm^2$)/slpm.

8. A method comprising:
   flowing a supercritical fluid with particles, through a sintered porous composite material, said sintered porous composite material comprising a porous base material of sintered metal particles; and a porous layer of sintered nanoparticle material sintered to the porous base material, said porous layer of sintered nanoparticle material on one or more surfaces of the porous base material penetrates a portion of said porous base material, said porous layer of sintered nanoparticle material having pores with a largest dimension of less than 200 nanometers and wherein said porous composite material has a sieving LRV of at least 4 for 0.05 μm particles and a sieving LRV of at least 5 for 0.2 μm particles when challenged in water using PSL beads; and
   removing particles from the supercritical fluid by sieving filtration.

9. The method of claim 8 wherein the sintered porous composite material has a pressure coefficient in nitrogen of less than 125 (psi $cm^2$)/slpm.

10. The method of claim 8 wherein said sintered nanoparticle material is comprised of metals, metal alloys, and mixtures of these materials.

11. The method of claim 10 wherein said porous sintered nanoparticle material is nickel, a nickel alloy, chromium alloy, a stainless steel.

12. The method of claim 8, wherein said porous sintered nanoparticle material includes sintered dendritic nanoparticles.

13. The method of claim 8 wherein said sintered porous composite material is bonded to a housing.

14. The method of claim 8 wherein said supercritical fluid is carbon dioxide.

15. The method of claim 8 wherein 5 liters of supercritical $CO_2$ fluid filtered through the porous composite material deposits less than 300 particles greater than 0.2 microns in size on a 200 millimeter diameter Si wafer.

* * * * *